US012647689B2

(12) United States Patent　(10) Patent No.:　US 12,647,689 B2

Thielemans et al.　(45) Date of Patent:　Jun. 2, 2026

(54) METHODS FOR IMPROVED CAMERA VIEW IN STUDIO APPLICATIONS

(71) Applicant: STEREYO BV, Nazareth (BE)

(72) Inventors: Robbie Thielemans, Nazareth (BE); Vince Dundee, Glendale, CA (US)

(73) Assignee: STEREYO BV, Nazareth (BE)

( * ) Notice: Subject to any disclaimer, the term of this patent is extended or adjusted under 35 U.S.C. 154(b) by 61 days.

(21) Appl. No.: 18/436,844

(22) Filed: Feb. 8, 2024

(65) Prior Publication Data

US 2024/0187747 A1　Jun. 6, 2024

Related U.S. Application Data

(63) Continuation of application No. 17/865,096, filed on Jul. 14, 2022, now Pat. No. 11,924,560.

(Continued)

(30) Foreign Application Priority Data

Jan. 11, 2022　(BE) ................................. 2022/5007

(51) Int. Cl.
　　*H04N 23/88*　　(2023.01)
　　*G09G 3/32*　　(2016.01)
　　　　　(Continued)

(52) U.S. Cl.
　　CPC .............. *H04N 23/88* (2023.01); *G09G 3/32* (2013.01); *G09G 5/12* (2013.01); *H04N 5/77* (2013.01);
　　　　　(Continued)

(58) Field of Classification Search
　　CPC ............ H04N 23/88; H04N 5/77; H04N 9/64; H04N 17/002; H04N 23/73; H04N 5/222; G09G 3/32; G09G 5/12; G09G 2320/0693; G09G 2340/06; G09G 2354/00; G09G 3/2014; G09G 2360/145; G09G 2310/08;
　　　　　(Continued)

(56) References Cited

U.S. PATENT DOCUMENTS

| | | | |
|---|---|---|---|
| 5,767,818 A | 6/1998 | Nishida | |
| 6,055,071 A | 4/2000 | Kuwata et al. | |

(Continued)

FOREIGN PATENT DOCUMENTS

| | | |
|---|---|---|
| BE | 20195196 | 3/2019 |
| BE | 20195142 | 7/2019 |

(Continued)

OTHER PUBLICATIONS

Belgian Search Report from Belgian Patent Application No. BE202305595, Nov. 21, 2023.

(Continued)

*Primary Examiner* — Abdelaaziz Tissire

(74) *Attorney, Agent, or Firm* — Workman Nydegger

(57)　　　　　ABSTRACT

A method is provided for allocating content to be shown on a light source display not being viewable for a first camera in an arrangement comprising the light source display and the first camera recording images displayed by the light source display. The first camera includes a shutter having a shutter opening time. The method including, out of the shutter opening time, displaying on said light source display said content.

22 Claims, 21 Drawing Sheets

Related U.S. Application Data

(60) Provisional application No. 63/221,822, filed on Jul. 14, 2021.

(51) Int. Cl.

| | |
|---|---|
| *G09G 5/12* | (2006.01) |
| *H04N 5/77* | (2006.01) |
| *H04N 9/64* | (2023.01) |

(52) U.S. Cl.
CPC ....... *H04N 9/64* (2013.01); *G09G 2320/0693* (2013.01); *G09G 2340/06* (2013.01); *G09G 2354/00* (2013.01)

(58) Field of Classification Search
CPC .. G09G 5/10; G09G 2320/064; G09G 3/3406; G09G 2340/0435; G09G 5/006; G09G 2320/0247; G09G 2320/0626; G09G 3/342; G09G 2320/0233; G09G 3/3208; G09G 2300/026
See application file for complete search history.

(56) References Cited

U.S. PATENT DOCUMENTS

| | | | |
|---|---|---|---|
| 6,483,555 | B1 | 11/2002 | Thielemans et al. |
| 6,717,625 | B1 | 4/2004 | Thielemans |
| 7,015,902 | B2 | 3/2006 | Nagai et al. |
| 7,019,721 | B2 | 3/2006 | Thielemans et al. |
| 7,071,620 | B2 | 7/2006 | Devos et al. |
| 7,071,894 | B1 | 7/2006 | Thielemans et al. |
| 7,079,092 | B2 | 7/2006 | Tanghe et al. |
| 7,102,601 | B2 | 9/2006 | Devos et al. |
| 7,157,838 | B2 | 1/2007 | Thielemans et al. |
| 7,176,861 | B2 | 2/2007 | Dedene et al. |
| 7,205,729 | B2 | 4/2007 | Thielemans et al. |
| 7,227,519 | B1 | 6/2007 | Kawase et al. |
| 7,262,753 | B2 | 8/2007 | Tanghe et al. |
| 7,301,273 | B2 | 11/2007 | Dedene et al. |
| 7,365,720 | B2 | 4/2008 | Bouwens et al. |
| 7,443,466 | B2 | 10/2008 | Dedene et al. |
| 7,777,691 | B1 | 8/2010 | Nimmer et al. |
| D730,309 | S | 5/2015 | Hochman et al. |
| 9,069,519 | B1 | 6/2015 | Hall |
| D751,998 | S | 3/2016 | Hochman et al. |
| 9,380,720 | B2 | 6/2016 | Thielemans et al. |
| 9,477,438 | B1 | 10/2016 | Hochman et al. |
| D771,844 | S | 11/2016 | Hochman et al. |
| 9,524,666 | B2 | 12/2016 | Hochman et al. |
| 9,660,403 | B2 | 5/2017 | Hochman et al. |
| 10,009,605 | B1* | 6/2018 | Yin ........................ H04N 17/02 |
| 10,325,541 | B2 | 6/2019 | Hochman et al. |
| 10,333,109 | B2 | 6/2019 | Hochman et al. |
| 10,892,297 | B2 | 1/2021 | Chae et al. |
| 10,917,679 | B2 | 2/2021 | Dunning et al. |
| 11,310,436 | B2 | 4/2022 | Hochman et al. |
| 11,328,655 | B2 | 5/2022 | Sugiyama et al. |
| 11,445,123 | B2 | 9/2022 | Deighton |
| 11,496,726 | B2 | 11/2022 | Deighton |
| 11,552,061 | B2 | 1/2023 | Chae et al. |
| 11,610,543 | B2 | 3/2023 | Thielemans et al. |
| 11,695,907 | B2 | 7/2023 | Steudel et al. |
| 11,881,151 | B2 | 1/2024 | Thielemans et al. |
| 11,924,560 | B2 | 3/2024 | Thielemans et al. |
| 11,948,501 | B2 | 4/2024 | Thielemans et al. |
| 11,948,506 | B2 | 4/2024 | Thielemans et al. |
| 2002/0163513 | A1 | 11/2002 | Tsuji |
| 2003/0095138 | A1 | 5/2003 | Kim et al. |
| 2003/0128299 | A1 | 7/2003 | Coleman et al. |
| 2003/0133619 | A1 | 7/2003 | Wong et al. |
| 2004/0113875 | A1 | 6/2004 | Miller et al. |
| 2004/0207315 | A1 | 10/2004 | Thielemans et al. |
| 2004/0212582 | A1 | 10/2004 | Thielemans et al. |
| 2004/0233125 | A1 | 11/2004 | Tanghe et al. |
| 2004/0233148 | A1 | 11/2004 | Tanghe et al. |

| | | | |
|---|---|---|---|
| 2005/0017922 | A1 | 1/2005 | Devos et al. |
| 2005/0052375 | A1 | 3/2005 | Devos et al. |
| 2005/0116667 | A1 | 6/2005 | Mueller et al. |
| 2005/0122406 | A1 | 6/2005 | Voss et al. |
| 2005/0128751 | A1 | 6/2005 | Roberge et al. |
| 2005/0133761 | A1 | 6/2005 | Thielemans |
| 2005/0134525 | A1 | 6/2005 | Tanghe et al. |
| 2005/0134526 | A1 | 6/2005 | Willem et al. |
| 2005/0213128 | A1 | 9/2005 | Imai et al. |
| 2006/0022914 | A1 | 2/2006 | Kimura et al. |
| 2006/0139238 | A1 | 6/2006 | Chiba et al. |
| 2006/0290614 | A1 | 12/2006 | Nathan et al. |
| 2007/0081357 | A1 | 4/2007 | Kim et al. |
| 2007/0165197 | A1* | 7/2007 | Yamada ............... H04N 9/3185 353/121 |
| 2007/0241988 | A1 | 10/2007 | Zerphy et al. |
| 2007/0253008 | A1 | 11/2007 | Edge et al. |
| 2007/0263394 | A1 | 11/2007 | Thielemans et al. |
| 2008/0046217 | A1 | 2/2008 | Polonskiy et al. |
| 2008/0079816 | A1 | 4/2008 | Yen et al. |
| 2008/0111773 | A1 | 5/2008 | Tsuge |
| 2008/0165081 | A1 | 7/2008 | Lawther et al. |
| 2008/0285981 | A1 | 11/2008 | Diab et al. |
| 2009/0009103 | A1* | 1/2009 | McKechnie ........... H05B 47/19 315/291 |
| 2009/0066631 | A1 | 3/2009 | Lianza |
| 2009/0102957 | A1 | 4/2009 | Phelan |
| 2009/0103200 | A1 | 4/2009 | Feklistov et al. |
| 2009/0295706 | A1 | 12/2009 | Feng |
| 2010/0001648 | A1 | 1/2010 | De Clercq et al. |
| 2010/0103200 | A1 | 4/2010 | Langendijk |
| 2010/0243025 | A1 | 9/2010 | Bhatia et al. |
| 2010/0289783 | A1 | 11/2010 | Leppla |
| 2010/0302284 | A1 | 12/2010 | Karaki |
| 2010/0309218 | A1 | 12/2010 | Suen et al. |
| 2011/0103013 | A1 | 5/2011 | Furukawa |
| 2011/0121761 | A1 | 5/2011 | Zhao |
| 2011/0176029 | A1 | 7/2011 | Boydston et al. |
| 2012/0019633 | A1 | 1/2012 | Holley |
| 2012/0033876 | A1 | 2/2012 | Momeyer et al. |
| 2012/0062622 | A1 | 3/2012 | Koyama et al. |
| 2012/0133837 | A1 | 5/2012 | Furukawa |
| 2012/0287289 | A1 | 11/2012 | Steinberg et al. |
| 2012/0307243 | A1 | 12/2012 | Elliott |
| 2012/0313979 | A1 | 12/2012 | Matsuura |
| 2013/0162696 | A1 | 6/2013 | Matsumoto |
| 2013/0181884 | A1 | 7/2013 | Perkins et al. |
| 2013/0226495 | A1 | 8/2013 | Marcu et al. |
| 2013/0249377 | A1 | 9/2013 | Hamer et al. |
| 2013/0272023 | A1 | 10/2013 | Lai |
| 2014/0002718 | A1 | 1/2014 | Spielberg |
| 2014/0009485 | A1 | 1/2014 | Asanuma |
| 2014/0009505 | A1 | 1/2014 | Moon et al. |
| 2014/0049571 | A1 | 2/2014 | Erinjippurath et al. |
| 2014/0049983 | A1 | 2/2014 | Nichol et al. |
| 2014/0125818 | A1 | 5/2014 | Friend |
| 2015/0070402 | A1 | 3/2015 | Shah et al. |
| 2015/0186097 | A1 | 7/2015 | Hall |
| 2015/0229919 | A1 | 8/2015 | Weber et al. |
| 2015/0339977 | A1 | 11/2015 | Nathan et al. |
| 2015/0348479 | A1 | 12/2015 | Kim et al. |
| 2015/0371405 | A1 | 12/2015 | Zhao |
| 2016/0078802 | A1 | 3/2016 | Liang et al. |
| 2016/0124091 | A1 | 5/2016 | Kawahito et al. |
| 2016/0182790 | A1 | 6/2016 | Horesh |
| 2016/0275835 | A1 | 9/2016 | Yuan et al. |
| 2016/0335958 | A1 | 11/2016 | Huang et al. |
| 2017/0032715 | A1 | 2/2017 | Sutherland et al. |
| 2017/0032742 | A1 | 2/2017 | Piper et al. |
| 2017/0061924 | A1 | 3/2017 | Lee et al. |
| 2017/0069871 | A1 | 3/2017 | Yim et al. |
| 2017/0171492 | A1 | 6/2017 | Naito |
| 2017/0284630 | A1 | 10/2017 | Sergenese et al. |
| 2017/0318178 | A1 | 11/2017 | Debevec et al. |
| 2018/0018793 | A1 | 1/2018 | Min et al. |
| 2018/0060014 | A1 | 3/2018 | Son et al. |
| 2018/0090102 | A1 | 3/2018 | Chappalli et al. |
| 2018/0091860 | A1 | 3/2018 | Stokking et al. |
| 2018/0131160 | A1 | 5/2018 | Zhang et al. |

(56) References Cited

U.S. PATENT DOCUMENTS

| | | |
|---|---|---|
| 2018/0235052 A1 | 8/2018 | Tada |
| 2018/0240409 A1 | 8/2018 | Li et al. |
| 2018/0342224 A1 | 11/2018 | Beon et al. |
| 2019/0064923 A1 | 2/2019 | Taniguchi |
| 2019/0080656 A1 | 3/2019 | Herranz et al. |
| 2019/0098293 A1 | 3/2019 | Lee et al. |
| 2019/0132560 A1 | 5/2019 | Grosse et al. |
| 2019/0172404 A1 | 6/2019 | Zhu |
| 2019/0209858 A1 | 7/2019 | Slaughter et al. |
| 2019/0212719 A1 | 7/2019 | Ono |
| 2019/0213951 A1 | 7/2019 | Li et al. |
| 2019/0244561 A1 | 8/2019 | Zong et al. |
| 2019/0295457 A1 | 9/2019 | Li et al. |
| 2019/0306477 A1 | 10/2019 | Nordback |
| 2019/0356940 A1 | 11/2019 | Mallett |
| 2019/0364309 A1 | 11/2019 | Von Braun et al. |
| 2019/0377535 A1 | 12/2019 | Rycyna et al. |
| 2020/0014904 A1 | 1/2020 | Wetzstein et al. |
| 2020/0027386 A1 | 1/2020 | Wang et al. |
| 2020/0037011 A1 | 1/2020 | Zong et al. |
| 2020/0043201 A1 | 2/2020 | Tanaka et al. |
| 2020/0098333 A1 | 3/2020 | Marcu |
| 2020/0126501 A1 | 4/2020 | Yamazaki et al. |
| 2020/0160791 A1 | 5/2020 | Chung |
| 2020/0225903 A1 | 7/2020 | Cohen |
| 2020/0280761 A1 | 9/2020 | Staples |
| 2020/0286424 A1 | 9/2020 | Thielemans et al. |
| 2020/0388210 A1 | 12/2020 | Thielemans et al. |
| 2020/0403117 A1 | 12/2020 | Fabien et al. |
| 2021/0005161 A1 | 1/2021 | Lee |
| 2021/0014385 A1 | 1/2021 | Boggavarapu et al. |
| 2021/0056937 A1 | 2/2021 | Sakai |
| 2021/0124174 A1 | 4/2021 | Tokunaga et al. |
| 2021/0125545 A1 | 4/2021 | Sohn et al. |
| 2021/0125570 A1 | 4/2021 | Kang et al. |
| 2021/0150998 A1* | 5/2021 | Jo ..................... G09G 3/3413 |
| 2021/0185778 A1 | 6/2021 | Otten |
| 2021/0201769 A1 | 7/2021 | Morris et al. |
| 2021/0217157 A1 | 7/2021 | Han et al. |
| 2021/0225267 A1* | 7/2021 | Thielemans .......... G06F 3/1446 |
| 2021/0227270 A1 | 7/2021 | Braun |
| 2021/0266624 A1 | 8/2021 | Zong et al. |
| 2021/0295766 A1 | 9/2021 | Sugiyama et al. |
| 2021/0297717 A1 | 9/2021 | Braun |
| 2021/0306394 A1 | 9/2021 | Zong et al. |
| 2021/0321032 A1* | 10/2021 | Braun .................. H04N 21/812 |
| 2021/0345058 A1 | 11/2021 | Itakura et al. |
| 2021/0366411 A1 | 11/2021 | Yang et al. |
| 2021/0383842 A1 | 12/2021 | Han et al. |
| 2021/0397398 A1 | 12/2021 | Han et al. |
| 2022/0014728 A1 | 1/2022 | Deighton |
| 2022/0020727 A1 | 1/2022 | Noh et al. |
| 2022/0059045 A1 | 2/2022 | Kobayashi et al. |
| 2022/0059607 A1 | 2/2022 | Murugan et al. |
| 2022/0060612 A1 | 2/2022 | Hochman et al. |
| 2022/0076615 A1 | 3/2022 | Ding et al. |
| 2022/0103738 A1 | 3/2022 | Deighton |
| 2022/0150456 A1 | 5/2022 | Steudel et al. |
| 2022/0191109 A1 | 6/2022 | Chen et al. |
| 2022/0246670 A1 | 8/2022 | Chen et al. |
| 2022/0254317 A1 | 8/2022 | Hochman et al. |
| 2022/0350562 A1 | 11/2022 | Wang et al. |
| 2022/0375387 A1 | 11/2022 | Deighton |
| 2022/0375403 A1 | 11/2022 | Cheng et al. |
| 2022/0413790 A1 | 12/2022 | Cai et al. |
| 2023/0013582 A1 | 1/2023 | Wang et al. |
| 2023/0154399 A1 | 5/2023 | Thielemans et al. |
| 2023/0162400 A1 | 5/2023 | Liu et al. |
| 2023/0162662 A1 | 5/2023 | Zhang et al. |
| 2023/0163142 A1 | 5/2023 | Lu et al. |
| 2023/0186821 A1 | 6/2023 | Hashempour et al. |
| 2023/0209207 A1 | 6/2023 | Hochman et al. |
| 2023/0274693 A1 | 8/2023 | Thielemans et al. |
| 2023/0282153 A1 | 9/2023 | Thielemans et al. |
| 2023/0298503 A1 | 9/2023 | Zhang et al. |
| 2023/0326175 A1 | 10/2023 | Zhang et al. |
| 2024/0022686 A1 | 1/2024 | Thielemans et al. |
| 2024/0044465 A1 | 2/2024 | Thielemans et al. |

FOREIGN PATENT DOCUMENTS

| | | |
|---|---|---|
| BE | 1026226 A1 | 11/2019 |
| CN | 102290003 A | 12/2011 |
| CN | 206741357 U | 12/2017 |
| CN | 207352560 U | 5/2018 |
| CN | 110602875 A | 12/2019 |
| CN | 110617000 A | 12/2019 |
| DE | 102006054856 A1 | 1/2009 |
| EP | 1172783 A1 | 1/2002 |
| EP | 1780798 A1 | 5/2007 |
| EP | 2323072 A1 | 5/2011 |
| EP | 3099058 A1 | 11/2016 |
| EP | 3139422 A2 | 3/2017 |
| GB | 2469819 A | 11/2010 |
| JP | 2007062892 A | 3/2007 |
| JP | 2019214445 A | 12/2019 |
| KR | 20170065163 A | 6/2017 |
| TW | 200608327 A | 3/2006 |
| TW | 200608328 A | 3/2006 |
| WO | 2013186278 A1 | 12/2013 |
| WO | 2015114720 A1 | 8/2015 |
| WO | 2018164105 A1 | 9/2018 |
| WO | 2019215219 A1 | 11/2019 |
| WO | 2020253249 A1 | 12/2020 |
| WO | 2021009719 A1 | 1/2021 |
| WO | 2022013191 A1 | 1/2022 |
| WO | 2022064062 A1 | 3/2022 |
| WO | 2022087322 A1 | 4/2022 |

OTHER PUBLICATIONS

Response to Belgian Search Report from Belgian Patent Application No. BE2023/5595, filed Mar. 21, 2024.

Extended European Search Report from European Patent Application No. EP23185674.1, Nov. 16, 2023.

Partial European Search Report from European Patent Application No. EP23198096, Nov. 29, 2023.

Extended European Search Report from European Patent Application No. EP23198096.2, Apr. 9, 2024.

Extended European Search Report from European Patent Application No. EP23190432.7, Feb. 12, 2024.

Extended European Search Report from European Patent Application No. EP23160521, Jul. 6, 2023.

Response to Extended European Search Report from European Patent Application No. EP23160521, dated Jan. 29, 2024.

Extended European Search Report from European Patent Application No. EP23218322.8, Mar. 27, 2024.

Extended European Search Report from European Patent Application No. EP23218336.8, Apr. 10, 2024.

Partial European Search Report from European Patent Application No. EP23218348.3, Apr. 30, 2024.

Extended European Search Report from European Patent Application No. EP23218353.3, Mar. 26, 2024.

Extended European Search Report from European Patent Application No. EP23218356.6, Apr. 5, 2024.

Extended European Search Report from European Patent Application No. EP23218377.2, Apr. 24, 2024.

Baker, Simon, "Pulse Width Modulation (PWM)", Mar. 17, 2015, 13 pages, TFT Central.

Burr, David, "Motion Perception: Human Psychophysics", Apr. 18, 2013, pp. 763-776, MIT Press.

Cast, Inc., "Understanding—and Reducing—Latency in Video Compression Systems", Oct. 25, 2013, 7 pages, retrieved from <https://web.archive.org/web/20131025202911/https://www.design-reuse.com/articles/33005/understanding-latency-in-video-compression-systems.html>.

Davis et al., "Humans perceive flicker artifacts at 500 Hz", Feb. 3, 2015, 4 pages, Nature, Scientific Reports.

(56) References Cited

OTHER PUBLICATIONS

Kang et al., "Nanoimprinted Semitransparent Metal Electrodes and Their Application in Organic Light-Emitting Diodes," May 21, 2007, 6 pages, Advanced Materials.

Larson, Jennifer, "How Many Frames Per Second Can the Human Eye See?", Oct. 20, 2020, 12 pages, retrieved from <https://www.healthline.com/health/human-eye-fps>.

Lee et al., "Solution-Processed Metal Nanowire Mesh Transparent Electrodes", Jan. 12, 2008, pp. 689-692, Nano Letters, vol. 8, No. 2.

Mackin et al., "High Frame Rates and the Visibility of Motion Artifacts", Jun. 30, 2017, 19 pages, SMPTE Motion Imaging Journal, vol. 126, Issue 5.

Thielemans, Robbie, "Displays Applications of LEDs", Handbook of Visual Display Technology, May 21, 2011, 14 pages.

Thielemans, Robbie, "LED Display Applications and Design Considerations", Handbook of Visual Display Technology, May 21, 2011, 5 pages, retrieved from https://link.springer.com/referenceworkentry/10.1007/978-3-540-79567-4_76.

Tobii Connect, "The speed of human visual perception", Sep. 14, 2022, 1 page, retrieved from <https://connect.tobii.com/s/article/the-speed-of-human-perception?language=en_US>.

Wikipedia, "MAC Address", 10 pages, retrieved from <https://en.wikipedia.org/wiki/MAC_address>.

Wilson, Derek, "Exploring Input Lag Inside Out", Jul. 16, 2019, 2 pages, retrieved from <https://www.anandtech.com/show/2803>.

Zhang, Yin, "Performance Characteristics of Lithium Coin Cells for Use in Wireless Sensing Systems", Jun. 17, 2012, 143 pages, All Theses and Dissertations, Brigham Young University.

"The Ins and Outs of HDR—Gamma Curves", Jun. 8, 2020, 3 pages, retrieved from <https://www.eizoglobal.com/library/management/ins-and-outs-of-hdr/index2.html>.

Extended European Search Report from corresponding EP Application No. EP18198749.6, Nov. 12, 2018.

International Search Report and Written Opinion from PCT Application No. PCT/EP2019/061804, Jun. 13, 2019.

Applicant's Amendment/Remarks filed at the EPO on Feb. 20, 2020 for PCT/EP2019/061804.

Applicant's Amendment/Remarks filed at the EPO on May 26, 2020 for PCT/EP2019/061804.

International Preliminary Report on Patentability from PCT/EP2019/061804, Jul. 10, 2020.

Belgian Search Report from BE Application No. 201905196, Aug. 13, 2019.

Search Report for BE 2019/05759 mailed Jan. 23, 2020, 18 pages.

Belgian Search Report for Belgian Patent Application No. BE2019/5970, Jul. 24, 2020.

Response to Belgian Search Report for Belgian Patent Application No. BE2019/5970, filed by Applicant at the Belgian Patent Office on Nov. 24, 2020.

Belgian Search Report from corresponding Belgian Application No. BE 202205007, Jun. 7, 2022.

Extended European Search Report from corresponding EP Application No. 22185014.2, Dec. 8, 2022.

Office Action from European Application No. 19722133.6, Jan. 19, 2023.

Partial European Search Report from Corresponding European Patent Application No. EP23198096, Nov. 29, 2023.

Extended European Search Report from Corresponding European Patent Application No. EP23198096.2, Apr. 9, 2024.

* cited by examiner (prior-art)

METHODS FOR IMPROVED CAMERA VIEW IN STUDIO APPLICATIONS

CROSS-REFERENCE TO RELATED APPLICATIONS

This application is a continuation of U.S. patent application Ser. No. 17/865,096, filed Jul. 14, 2022 and claims the benefit of priority of U.S. Provisional Application 63/221,822 filed at the USPTO on Jul. 14, 2021, and Belgian patent application BE 2022/5007, filed at the Belgian Patent Office on Jan. 11, 2022. The disclosures of U.S. Ser. No. 17/865,096 and priority documents U.S. 63/221,822 and BE 2022/5007 are herein incorporated by reference.

TECHNICAL FIELD

The invention relates to a studio display environment and/or applications thereof, wherein a display (e.g. LED display) is used onto which images or video are being shown, that are recorded by one or more cameras. In particular the invention relates to methods for improved camera view in such studio display environment and/or applications.

BACKGROUND OF THE INVENTION

As yet mentioned in US patent application publication US2020/0388210, entitled "ACOUSTIC STUDIO LED SCREEN" and published 10 Dec. 2020 from the same Applicant, existing displays, both using light emitting (e.g. LED or OLED) or reflective technologies (e.g. LCD) that are used for studio applications, meaning within for example a broadcasting environment, in general show defects on the final screen (resulting from camera recording) that is seen by the public or user. US2020/0388210 is herein incorporated by reference in its entirety. Complex and cumbersome manipulation is then often performed to make images acceptable again for the viewer, whereas only a mere acceptability is provided by lack of better availability. However, a robust and simple solution is yet described in said previous application in relation to the sync-banding principle, i.e. Vertical Sync Update as described in [0057]-[0060] of US2020/0388210, wherein a synchronization is provided by means of having a programmable update time of new entering images or the sync signal with which new images are scanned. The programmable aspect implies that it can be programmed such that certain amount of time is waited until images are viewed or represented.

The invention as described in US2020/0388210 from the same Applicant, comprises the idea to move the start of the image (on the display) to avoid so-called banding or banding effects and thus to ensure that the image is in the visibility window (i.e. part or ribbon viewed on camera) of the camera shutter (opening) time. Banding known in the art, being the effect that banding or bands appears on camera when recording a display image (in the background). When watching the news or sports on TV for example, and behind the speaker or journalist is a (LED) screen mounted with video or image displayed thereon, it is common that the screen in the back shows the video or image with banding effects. In case of a LED screen for example, this banding phenomena is (mainly) caused by the PWM (pulse-width modulation) signal of the image being shown on the display, in particular because the shutter (opening) time of the camera may start at different positions of the PWM (i.e. at lower power/brightness versus higher power/brightness), hence showing alternatingly brighter and darker images, resulting in images shown with bands having brighter and darker strips or parts.

As referred to above, cameras are used for recording in the studio. In case of a studio recording event open for the public, studio scenes are also captured by the audience. A high-quality representation for both cameras, hence remote viewer e.g. at home, and audience, i.e. live studio viewer, may be quite a challenge in this respect. There is a need for a studio display environment with enhanced high-quality features for the particular purpose of recording and viewing applications.

SUMMARY OF THE INVENTION

The aim of the invention is to enhance camera and/or audience view in a studio display environment and/or applications.

According to a first aspect of the invention, a method is provided for improving the interplay of a light source display with a camera recording the image displayed by the light source display, the method comprising the steps of: (i) receiving a light source display input signal; (ii) receiving one or more values representing a programmable off-set (of the light source display input signal or the image being displayed on the light source display) relative to the operation of the camera having a shutter and corresponding shutter time; and (iii) applying the light source display input signal to the light source display, based on the one or more programmable off-set values. Prior to step (iii) an intermediate step may be provided for receiving a signal related to the operation of the camera. The light source display is for example a Light Emitting Diode (LED) display.

The one or more programmable off-set values can be selected to improve the interplay of the light source display with the camera in order to improve energy efficiency and/or to reduce banding effects.

The signal related to the operation of the camera is for example a synchronization signal, preferably at the time the camera shutter is opening, or the signal appearing at the time the camera shutter closes.

In an embodiment, one of the one or more programmable off-set values being a programmable start and, in step (iii) the light source display input signal to the light source display is applied from (i.e. after or at) the programmable start, being from (i.e. after or at) the time the camera shutter is opening.

In an embodiment, one of the one or more programmable off-set values being a programmable stop and, in step (iii) the light source display input signal to the light source display is applied before or until the programmable stop, being before or until the time the camera shutter closes.

In an embodiment, one of the one or more programmable off-set values being a programmable blank time and, in step (iii) the light source display input signal to the light source display is applied, after or before the programmable blank time i.e. out of the programmable blank time, being during the camera shutter opening time i.e. after or at the time the camera shutter is opening, and before or until the time the camera shutter closes.

According to an embodiment, a method is provided for automatically optimally determining the one or more programmable off-set values of any aspect or embodiment above in relation to the start and length of the camera shutter opening time and/or automatically determining the start and length of the camera shutter opening time (in order to improve energy efficiency and/or to reduce banding effects) (for further use in the method of first aspect or any of the embodiments thereof). Optimally determining the one or more programmable off-set values here means determining for a certain purpose, and in a best possible, realizable or achievable manner. Determining the start and length of the camera shutter opening time here means getting to know, whereas these parameters are in fact fixed settings being yet anchored but not always known. The method comprises (after a step of initializing the values e.g. by means of predetermined values) the following steps: (i) displaying an image; (ii) (gradually) changing the one or more programmable off-set values and/or the start and length of the shutter opening time; (iii) analyzing the recording of the image on the camera in accordance with step (iii) of the first aspect for each of the one or more programmable off-set values and/or the start and length during the (gradually) changing thereof in (ii); and (iv) using this analyzing for determining suitable programmable off-set values and/or start and length of the camera shutter opening time.

According to an embodiment, a method is provided for automatically determining start and length of the shutter opening time of a camera in a (studio) environment or arrangement, comprising a display and the camera recording images from the display, wherein the method comprises the following steps: (i) displaying an image with defined ON time; (ii) (gradually) changing position of the ON time by means of using a programmable timing; (iii) analyzing the recording of the image on the camera for each of the positions during the (gradually) changing thereof in (ii); and (iv) using this analyzing for determining when the shutter opening time of the camera starts and when it ends.

According to further embodiment, the image has a predetermined number of PWM cycles, and the method further comprises the step of (v) using, in order to maximize (when desired) the output of image (for brightness and grayscales) within the opening window, one or more of the following steps: (a) increasing or decreasing the predetermined number of PWM cycles; (b) modifying the clock of the PWM cycles; (c) modifying the bit depth, i.e. increasing or decreasing the number of bits of the PWM cycles, and/or (d) using a clock with dynamic frequency for the PWM cycles, wherein such clock with dynamic frequency having a frequency pattern being related to the human eye sensitivity.

According to an embodiment of the first aspect, the invention relates to a method for improving the interplay of a light source display with a camera recording the image displayed by the light source display, the method comprising: (i) receiving a light source display input signal; (ii) receiving a synchronization signal related to the camera; (iii) receiving a value representing a programmable delay relative to the synchronization signal and (iv) applying the light source display input signal to the light source display, before the programmable delay value relative to the synchronization signal related to the camera. The light source display can be a Light Emitting Diode (LED) display. The programmable delay value can be selected to improve the interplay of the light source display with the camera in order to improve energy efficiency.

According to an embodiment, a method is provided for improving the interplay of a light source display with a camera recording the image displayed by the light source display, the method comprising: (i) receiving a light source display input signal; (ii) receiving a synchronization signal related to the camera; (iii) receiving a value representing a programmable blank time relative to the synchronization signal; and (iv) applying the light source display input signal to the light source display, after or before the programmable blank time of the light source display input signal relative to the synchronization signal related to the camera. Again, the light source display can be a Light Emitting Diode (LED) display. The programmable blank time value can be selected to improve the interplay of the light source display with the camera in order to reduce banding effects and/or improve energy efficiency.

According to a second aspect of the invention, a method is provided for defining display (driver) parameters of a light source display in a context with a camera recording the image displayed by the light source display wherein the light source is driven by PWM (driver) in relation to a given camera shutter opening time, wherein the method (after a step of initializing the display (driver) parameters e.g. by means of predetermined values) comprising: (i) modifying (e.g. increasing or decreasing) one or more of PWM (driver) parameters selected from the group of: the number of PWM cycles, the clock of the PWM cycles, the bit depth, i.e. the number of bits of the PWM cycles; and/or (ii) introducing a clock with dynamic frequency for the PWM cycles (having a frequency pattern being related to the human eye sensitivity), in order to maximize (when desired) the output of image (for brightness and grayscales) within the camera shutter opening time. Optionally this method being part of the method of the first aspect or any of the embodiments thereof, herewith particularly referring to the embodiment wherein a method is provided for automatically optimally determining one or more programmable off-set values and/or automatically determining the start and length of the camera shutter opening time, as given above.

According to an embodiment, a method is provided for defining the opening time of a shutter of a camera recording an image from a display, wherein the image has a predetermined number of PWM cycles, the method comprising at least one of the following steps: (a) increasing or decreasing the predetermined number of PWM cycles; (b) modifying the clock of the PWM cycles; (c) modifying the bit depth, i.e. increasing or decreasing the number of bits of the PWM cycles; and/or (d) using a clock with dynamic frequency for the PWM cycles, wherein such clock with dynamic frequency having a frequency pattern being related to the human eye sensitivity.

According to a third aspect, a (studio) arrangement is provided, comprising at least one light source display, and at least one camera arranged for recording the image displayed by the at least one light source display; wherein the light source display being adapted (e.g. receiving values) for applying any of the methods of first and second aspect of the invention.

According to a fourth aspect, a method is provided for allocating content to be shown on a light source display not being viewable for a first camera in a (studio) environment or (studio) arrangement as in third aspect comprising the first camera recording images displayed by the light source display, the first camera comprising a shutter having a shutter opening time, wherein the method comprising: out of the shutter opening time, displaying on the light source display the content and being for example video or images, text or graphics, or (infrared) markers.

The content can be viewable for the human eye, or for a second camera having a different shutter opening time than the first camera. The content to be shown on the light source display, can be fed from an external video source, or from an internal on-display non-volatile data storage. During the shutter opening time of the first camera, other content can be displayed on the light source display. In addition to the content and/or other content, further content can be displayed on the light source display being visible only e.g. by an infrared camera.

According to an embodiment, a method is provided for defining content to be shown on a display in a (studio) environment/arrangement comprising a camera recording part of the content from the display, the camera comprising a shutter having a shutter opening time, wherein, out of the shutter opening time, the display is showing other part of the content being not viewable for the camera, and being for example video or images, text or graphics, or (infrared) markers.

Again, the other part of the content can be viewable for the human eye, or for another camera either having a different shutter opening time, or either being an infrared camera. And here also, the content to be shown on the display, can be fed from an external video source, or from an internal on-display non-volatile data storage.

According to an embodiment, a method is provided for defining content be viewed in a (studio) environment/arrangement comprising a camera recording part of the content from a display, the camera comprising a shutter having a shutter opening time, the method comprising the steps of (i) during the shutter opening time, showing part of the content on the display to be viewed by the camera; and (ii) outside of the shutter opening time, showing other part of the content on the display not to be viewed by the camera, and for example to be viewed by an audience (human eye), or else to be viewable for another e.g. infrared camera.

The content can be for example (moving/still) images, text or graphics, or (infrared) markers.

According to further aspect, an augmented (studio) arrangement is provided, comprising at least one light source display, and at least one camera arranged for recording the image displayed by the at least one light source display; wherein the light source display being adapted (e.g. receiving values) for applying any of the methods of first, second and third aspect of the invention.

According to a fifth aspect, a method is provided for automatic color adjustment to a desired level of a camera in a (studio) environment or (studio) arrangement as in third aspect comprising a light source display and the camera recording images from the light source display, the method comprising the steps of: (i) showing an R/G/B test pattern on the light source display; (ii) adjusting the R/G/B intensities of the camera (while analyzing the recording of the R/G/B test pattern on the camera) with the individual and respective R/G/B from the R/G/B test pattern on the light source display; (iii) measuring the R/G/B intensities of the camera of subsequent recorded (by the camera) R/G/B test patterns shown on the light source display; and repeating (ii) until the R/G/B intensities are at the desired level (known from the light source display).

According to a sixth aspect, a method is provided for color calibration over time, performed by a processing system of a (light-emitting) display, based on light-emitting elements (LEEs), in a (studio) environment or (studio) arrangement as in third aspect comprising a camera recording images from the display, the camera comprising a shutter having a shutter opening time, the method comprising performing a color measurement of a plurality of LEEs of the display;

determining color space values for the color measurement of the plurality of LEEs;

defining for the plurality of LEEs a first set of target colors in color space values;

defining for the plurality of LEEs a second set of target colors in color space values;

calculating a first calibration matrix based on the measured colors and on the first set of target colors, for during the shutter opening time;

calculating a second calibration matrix based on the measured colors and on the second set of target colors, for out of the shutter opening time;

defining a matrix factor (for time), being selectively chosen in relation to the shutter opening time, as a (real/integer) number;

calculating a final calibration matrix, defined by the first and second calibration matrix, each being weighed based on the matrix factor.

The (light-emitting) display is for example a light source display wherein the light-emitting elements (LEEs) are e.g. light emitting diodes or LEDs. The light source display being then a LED display.

According to a further aspect, a method is provided for color calibration over time, performed by a processing system of a (light-emitting) display, based on light-emitting elements (LEEs), in a (studio) environment or (studio) arrangement as in third aspect comprising a multiple camera system having multiple cameras recording images from the display, the multiple cameras comprising each a shutter with a shutter opening time, the method comprising performing a color measurement of a plurality of LEEs of the display;

determining color space values for the color measurement of the plurality of LEEs;

defining for the plurality of LEEs a first set of target colors in color space values;

defining for the plurality of LEEs at least a second set of target colors in color space values;

calculating a first calibration matrix based on the measured colors and on the first set of target colors, for during the shutter opening time of one of the multiple cameras;

calculating at least a second calibration matrix based on the measured colors and on at least second set of target colors, for during the shutter opening time of another of the multiple cameras;

defining a matrix factor (for time), being selectively chosen in relation to the shutter opening time of each of the multiple cameras, as a (real/integer) number;

calculating a final calibration matrix, defined by the first and at least second calibration matrix, each being weighed based on the matrix factor.

DETAILED DESCRIPTION OF THE INVENTION

This present invention comprises additional description in relation to the sync-banding principle (Vertical Sync Update) as mentioned in US patent application publication US2020/0388210, entitled "ACOUSTIC STUDIO LED SCREEN" and published 10 Dec. 2020. For some aspects of the present invention below, reference is also made to other earlier applications from the same Applicant, including WO2019/215219 A1, entitled "STANDALONE LIGHT-EMITTING ELEMENT DISPLAY TILE AND METHOD" and published 14 Nov. 2019, and US2020/0286424, entitled "REAL-TIME DEFORMABLE AND TRANSPARENT DISPLAY" and published 10 Sep. 2020, both of which are incorporated herein by reference in their entirety. Whenever appearing relevant for one of the aspects of the present invention, particular reference will be described in further detail below.

As general setting for the present invention, a studio display environment and/or applications thereof are considered, meaning that we have a display (e.g. LED display) onto which images or video is shown, that are being recorded by a camera. The camera has an in-built shutter system with shutter opening time. Hence, only part of the images or video will be viewed (in time) by the camera (not in space). As an extension, instead of just one, a multiple camera system can also be considered for the present invention.

Methods are proposed for improved camera view in studio display applications, for a better interplay of display with camera, recording images or video being displayed. Moreover, methods are provided for color calibration over time, performed by a processing system of a display (e.g. LED display) in a studio environment comprising one or more cameras recording images from such display. An improved performance in the making of pictures, movies, television shows or other kind of broadcasting, including also real-time events, particularly in relation to recording and viewing applications, is herewith achieved.

Figure 1:
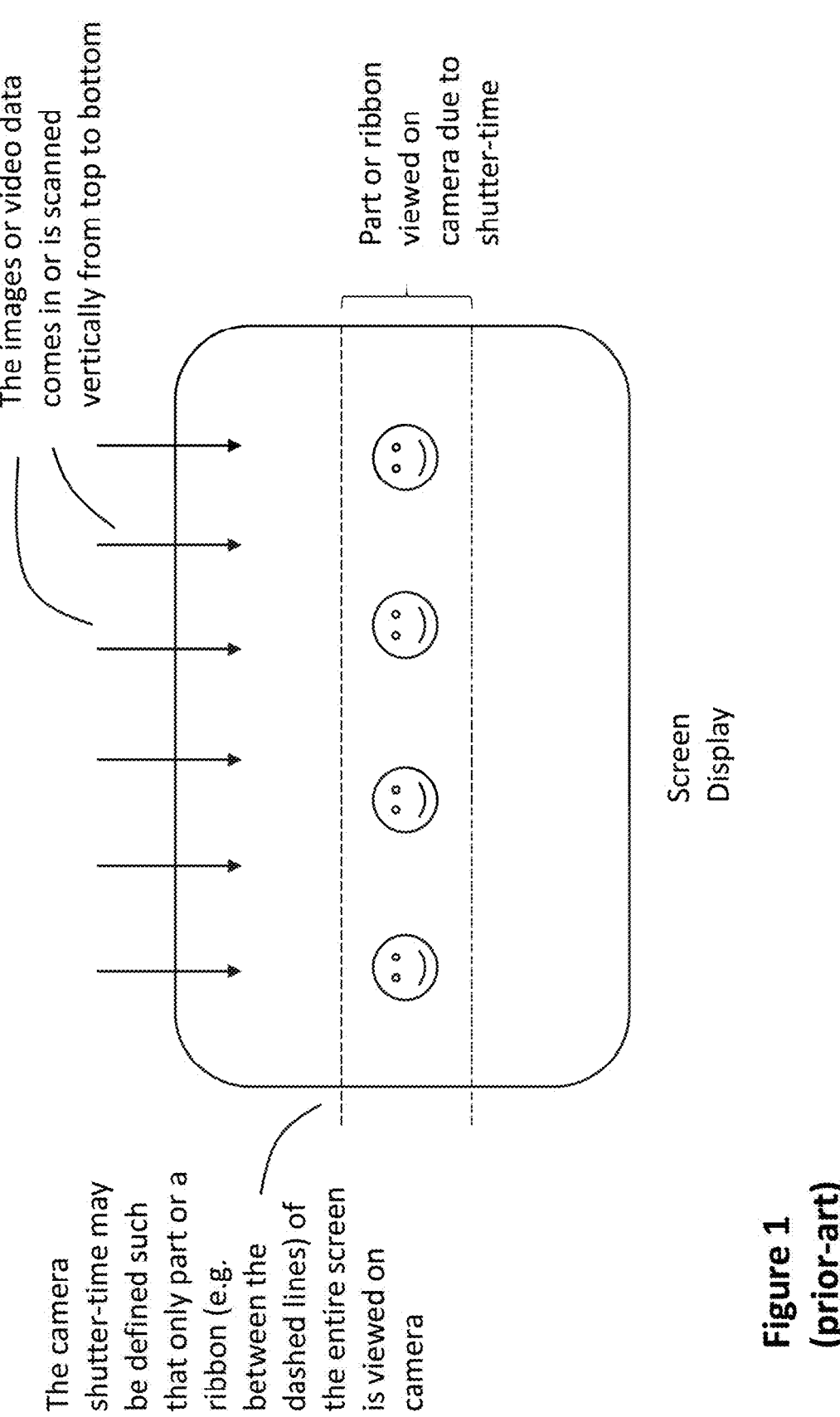
FIG. 1 illustrates the aspect of vertical sync update in relation to camera shutter time in accordance with the art.
Figure 2:
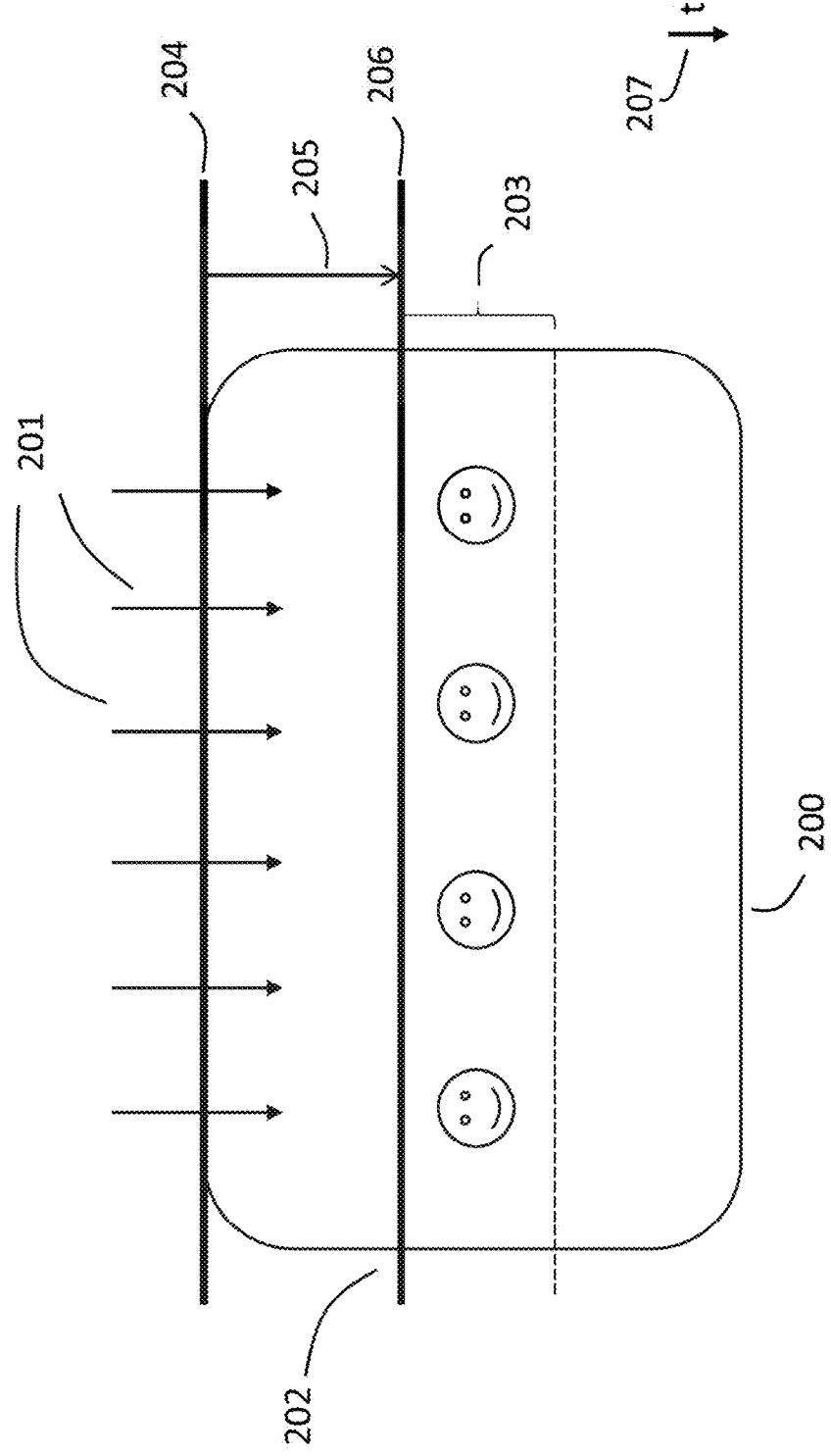
FIG. 2 illustrates an embodiment with further indications for illustrating the vertical sync update aspect.

FIG. 1 illustrates the aspect of vertical sync update in relation to camera shutter time in accordance with the art, as extracted from US patent application US 2020/0388210. Conform with what is specified in paragraph of US2020/0388210, FIG. 2 shows an embodiment with further indications for illustrating the vertical sync update aspect. Again, a screen or display 200 is shown, wherein the images or video data comes in or is scanned vertically from top to bottom 201, and wherein the camera shutter-time may be defined such that only part or a ribbon of the entire screen is viewed on camera 202. The part or ribbon 203 as viewed on camera due to shutter-time being also particularly indicated. We receive the Incoming Sync 204 and delay (being programmable via Programmed delay 205) the start of generation of the image (which is the start of the PWM generation in case of LED screens) so that it is in line with (the start of) the shutter opening time. The start of the PWM (of the image to be shown on the display) coinciding with the start of the shutter opening time (of the camera) can be referred to as a synchronization being implemented of those starts or signals related thereto. Hence the indication of Programmed sync 206 in FIG. 2. To specifically indicate the evolution in time, arrow 207 is given. Having solved the problem of banding by means of synchronization, we sometimes also refer to this solution as sync banding (adjustment).

Figure 3:
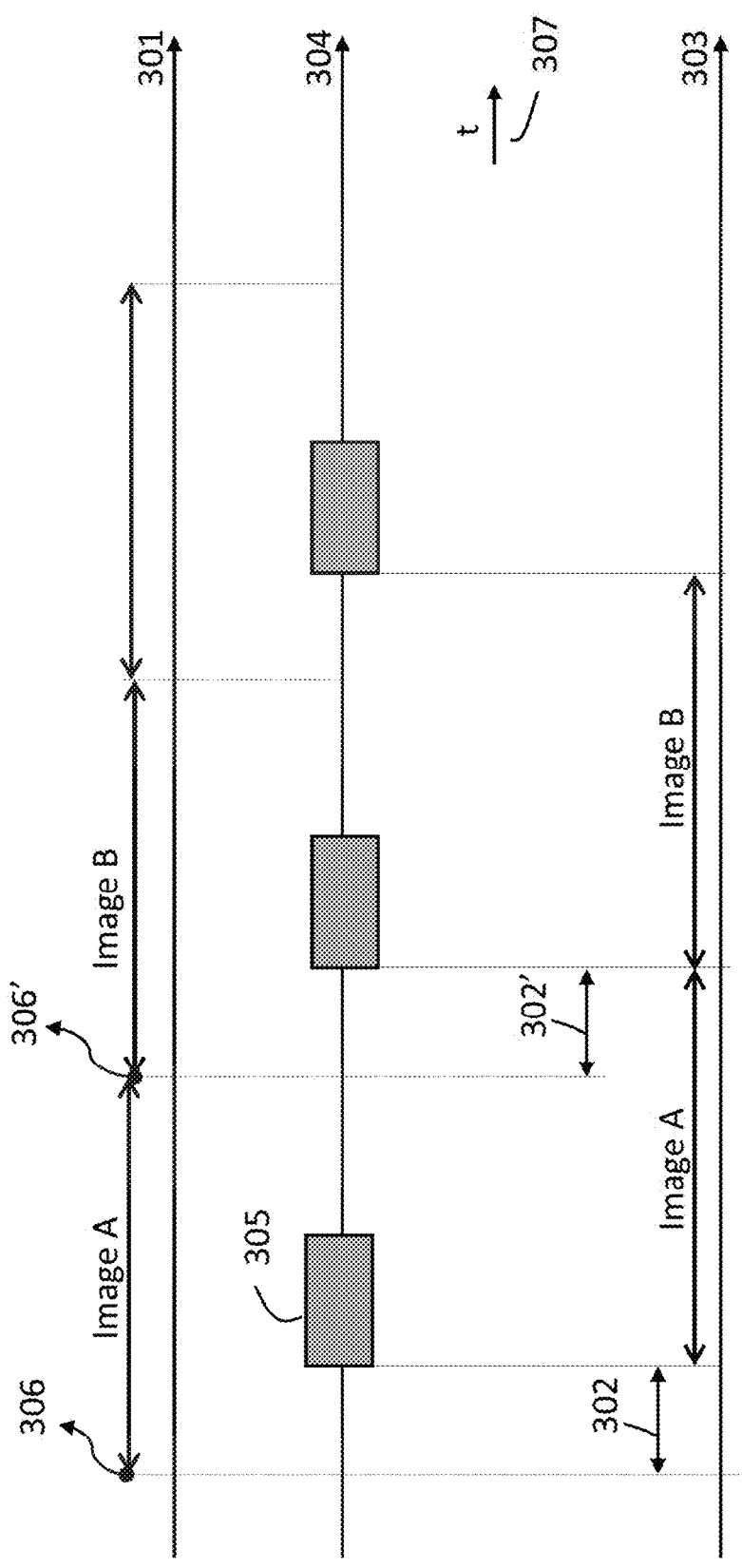
FIG. 3 shows an embodiment with alternative view of FIG. 2 in the time domain.

In addition to FIG. 2, an embodiment with alternative view in the time domain (or time division view) is depicted in FIG. 3, wherein the signal of the video source, the evolution (in time) on camera, and the output of the display are all given in function of the time (moving forward with the arrow 307). For an image, Image A, given at Sync signal 306 from the video feed or source 301 to be shown, a certain time called Programmed delay 302 is waited until Image A is indeed shown on the display 303. The Programmed delay 302 is the amount of time until the viewing time 305 on camera 304 is becoming active, or in other words when the opening time of the camera shutter starts. The viewing time 305 on camera 304 is moreover active during the entire camera shutter opening time (or else, the viewing time 305 on camera 304 corresponds with the camera shutter opening time). At the Sync signal 306' a new Image B is given a bit later, which can again be shown on the display 303 after having passed the Programmed delay 302' time. The Image A can remain on the display 303 until Image B needs to be shown. The process of receiving video images, programmable delaying and showing those images may further continue this way. It is not explicitly disclosed how long the images, e.g. Image A, are shown on the display 303, however, it is assumed here that they are shown entirely which is good enough to avoid banding effects. It is noted that the indications of video feed or source 301, camera 304, and display 303 are in fact the respective time lines (giving the evolution in time) of this source 301 or devices 303, 304.

Figure 4:
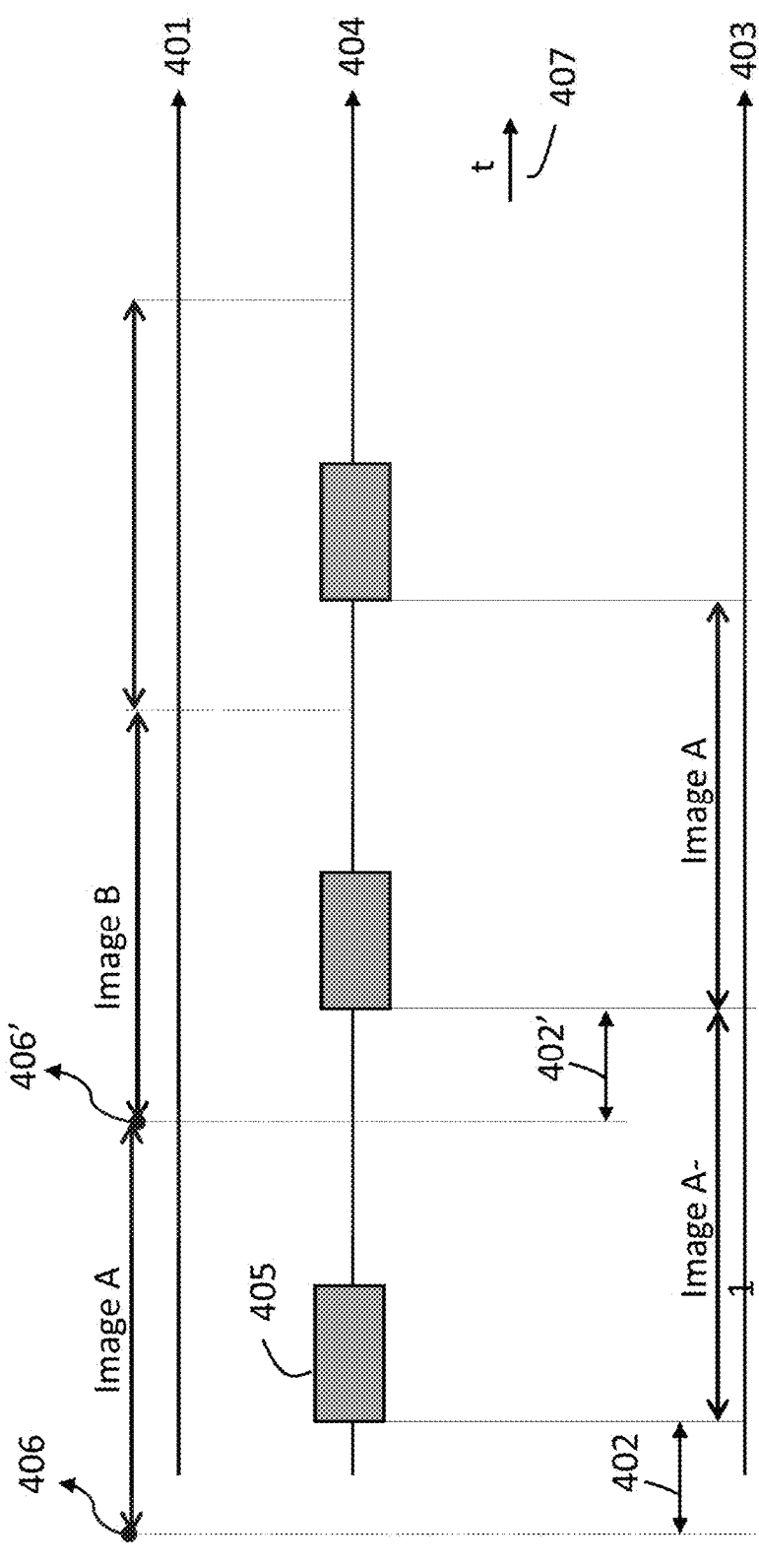
FIG. 4 shows an amended version of the embodiment with alternative view of FIG. 2 in the time domain.

It is noted that in FIG. 3, in fact Image A on our timeline should be Image A-1 as we can't predict the future, and herewith having a frame delay implied. At the moment that Image A is going to be shown, after receiving the (vertical) Sync signal, not everything from Image A will be immediately ready to be shown (whether or not the shutter from the camera being open). Hence, we can interpret this as a kind of image or frame delay itself. In order to be sure that all content is ready to be shown, we better first refer to Image A-1, and whenever Image A has passed entirely, we can show Image A. This leads us to the amended illustration as in the embodiment shown with FIG. 4, depicting images at respective Sync signal 406, 406' originating from the video feed or source 401, to be displayed on the display 403 after a Programmed delay 402, 402', and to be viewed on camera 404 during its viewing time 405, i.e. when the camera shutter is open. To specifically indicate the evolution in time, arrow 407 is given.

While referring to the basics of US2020/0388210, the aspect of vertical sync update in relation to camera shutter time is now extended with further description of the present invention, highlighting various new aspects (6 in total) represented by characterizing features accordingly.

Programmed or Programmable Stop

As clearly depicted for example in FIG. 3, the image e.g. Image A from the display 303 is only viewed on camera 304 during the shutter opening time 305. Hence, when the shutter closes, the image is being still shown, though not viewed by the camera 304. This can be seen as a rather inefficient way of showing images on the display 303 on one hand and using or viewing them on the camera 304 on the other hand. We appear to have some image waste (i.e. image not being used or viewed) during shutter (closing) time of the camera 304.

Displays exist wherein we can control the on/off state of every pixel individually. This means that, pixels can not only be programmed to start in on state (as described in US2020/0388210) after an amount of time or delay, but also they can be programmed to go in off state after a while or other/further amount of time. Therefore, in general when using PWM, we can, according to an aspect of the invention, in addition to implementing a programmable start, also have a programmable stop or end.

Figure 5:
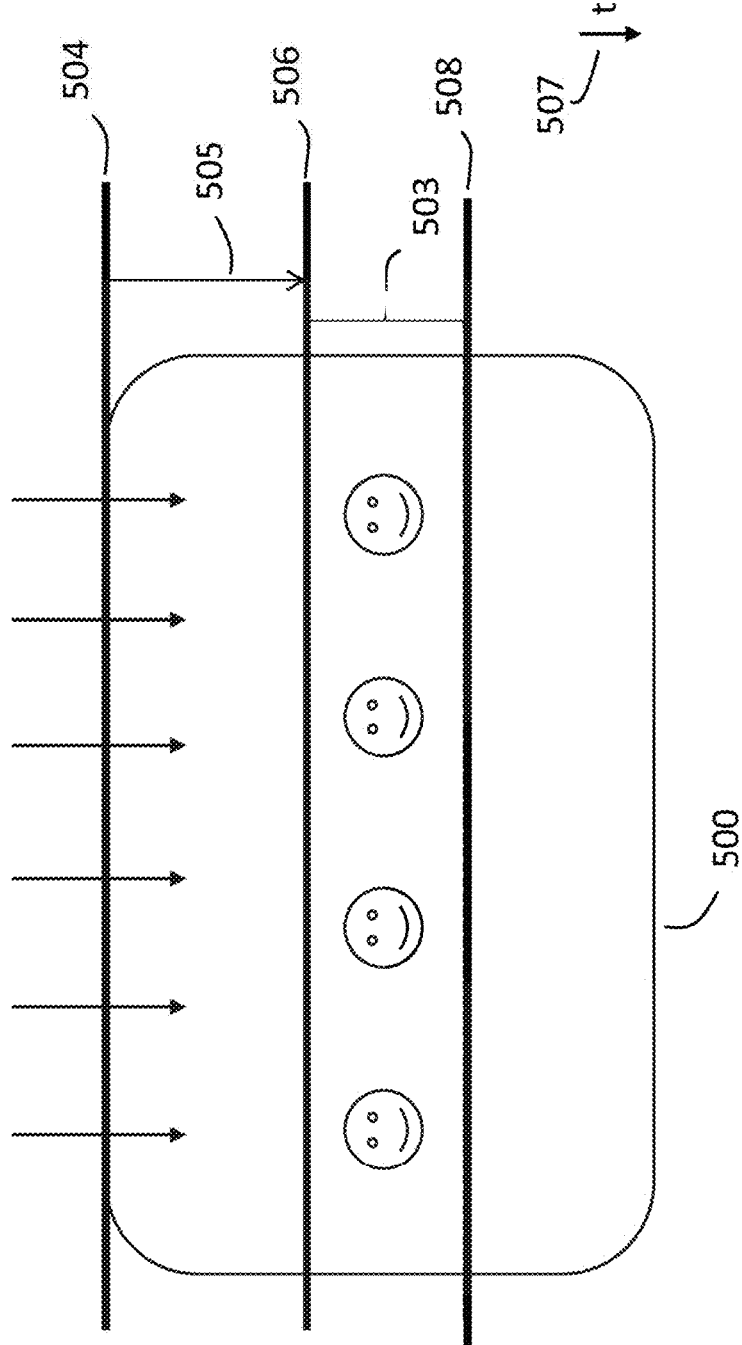
FIG. 5 shows an embodiment for illustrating the vertical sync update aspect wherein the programmable stop is provided, in accordance with the invention.

FIG. 5 shows a further embodiment for illustrating the vertical sync update aspect wherein the programmable stop has been provided. At the Incoming Sync 504, we delay the start of generation of the image to where the camera shutter opens, and this for a Programmed delay 505 time. We then only generate the image for the total length or duration of the camera shutter opening time, i.e. within part or ribbon 503 viewed on camera due to shutter time, starting at the Programmed sync 506 and ending at the beginning of Programmed delay to end 508. To specifically indicate the evolution in time, arrow 507 is given. The image is no longer shown or generated on the display when the shutter closes (again), hence at programmable stop or end. The start and length of opening time of the camera shutter can be obtained as input information from the camera settings. This may occur either manually or automatically when the camera feed is also used as input to a processor, which will be discussed further in a separate aspect of the invention.

Figure 6:
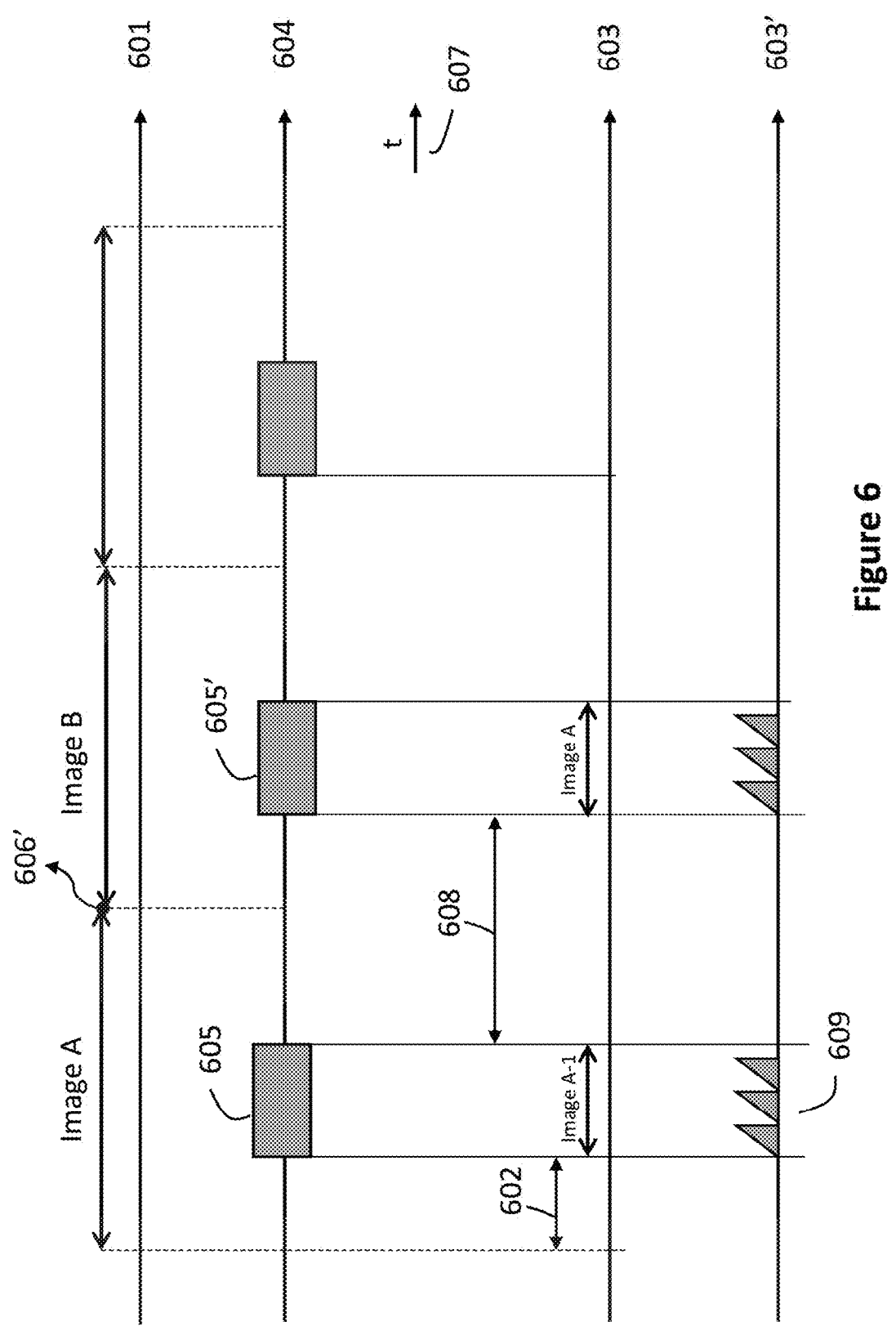
FIG. 6 shows an embodiment with alternative view of FIG. 5 in the time domain, with explicit stop, in accordance with the invention.

In addition to FIG. 5, an embodiment with alternative view in the time domain is depicted in FIG. 6 (this time with explicit stop). For an image, Image A, from the video feed or source 601 to be shown, a certain time called Programmed delay 602 is waited until previous Image A-1 is shown on the display 603. Again the evolution in time being indicated, here by arrow 607. The Programmed delay 602 is the amount of time until the viewing time 605 on camera 604 is becoming active, or in other words when the opening time of the camera shutter starts. In line with the description of FIG. 5, the Image A-1 is now only shown during the viewing time 605 on camera 604, meaning during the camera shutter opening time. Whenever the camera shutter closes, the Image A-1 is no longer displayed. Hence, there is an explicit stop for showing the Image A-1. Moreover, at this stop, the Programmed delay 608 starts before a new image, Image A, will be shown. A bit later during the Programmed delay 608 time, at the Sync signal 606' a further Image B is given by the source 601. Image A has now entirely passed, and hence can be shown on the display 603 after having passed the complete Programmed delay 608 time. The Image A will remain on the display 603, again as long as the viewing time 605' on camera 604 is active. The process of receiving video images, programmable delaying and showing those images may further continue this way. It is noted that the Programmed delay 608 is significantly larger than the Programmed delay 602, whereas a delay for showing the image is now not only programmed for the start of its view on the camera 604, but also when the image can no longer be viewed on the camera 604 because of the closing of its shutter time. A further display time line 603' is depicted in FIG. 6 for illustrating an example of PWM grayscale generation 609 for the display LEDs, for corresponding image, e.g. Image A-1, being shown during the viewing time 605 on camera 604.

Alternatively, according to an aspect of the invention, we can introduce a programmed blank instead of programmed delay for on/off state, for example when a display is being used wherein control of on/off state of every pixel individually is either not feasible or not preferred. Again, referring to for example FIG. 3, the image from the display is only viewed on camera during the shutter opening time. Hence, when the shutter closes, the image being still shown, though not viewed by or on the camera. The pixels cannot be programmed to start to on-state, or to stop to off-state. We appear to have some image waste (i.e. image not being used or viewed) during shutter closing time of the camera, which can be seen as waste of power or energy use.

Figure 7:
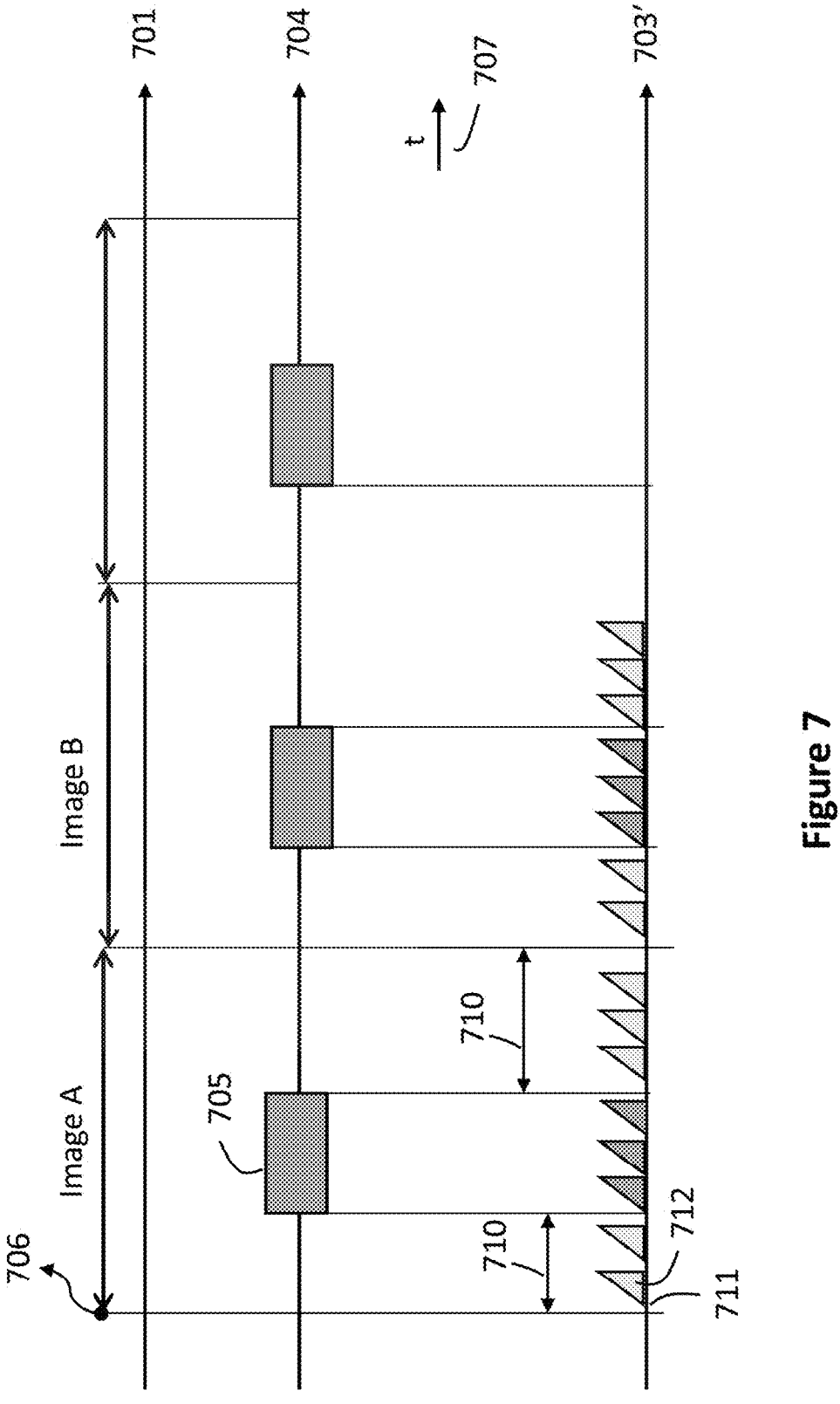
FIG. 7 shows an embodiment in the time domain, illustrating programmed blank time (no programmed delay), in accordance with the invention.

The solution of having a programmed blank is now described with FIG. 7. Again the evolution in time being indicated, here by arrow 707. Image A is given at Sync signal 706 from the video feed or source 701 to be shown. In this case, the display 703', representing PWM cycles, starts to generate its image when the Sync signal 706 comes. From that moment 711 on to the start of the shutter opening time 705, nothing will be viewed on camera 704. In order to save power or energy whenever the image is not being used or viewed on camera 704, and thus not having the pixels enlightened, without turning them off, the pixels can be so-called blanked (i.e. set to 0). Hence, the PWM or image is blanked 712, meaning temporarily put to 0. In case of a LED display being used for example, this would imply that the PWM generation of the LEDs is being disabled (or the on/off function of the pixels is being disabled), until the shutter of the camera opens (or camera shutter opening time 705 starts), and whenever the camera shutter closes again (or camera shutter opening time 705 stops). Instead of a programmable delay, we can now refer to a programmable or Programmed blank 710 time during which the pixels being blanked, and this in particular during the camera shutter closing time, i.e. anywhere or any time out of the viewing time 705 on camera 704.

It is noted that the above aspects of the invention (including the basics thereof as described in US2020/0388210) are applicable to any display used that 'lights' up a pixel multiple times in one image or frame, and hence not necessarily being related to a display generating its images with PWM cycles.

How to Define the Length for the Camera Shutter Opening Time

In case the camera shutter time varies, we can change the stop location. But whenever we do know the shutter opening time, the question is also how to achieve or define the length for such time, in view of the display signal for the image to be viewed on the camera.

Figure 8:
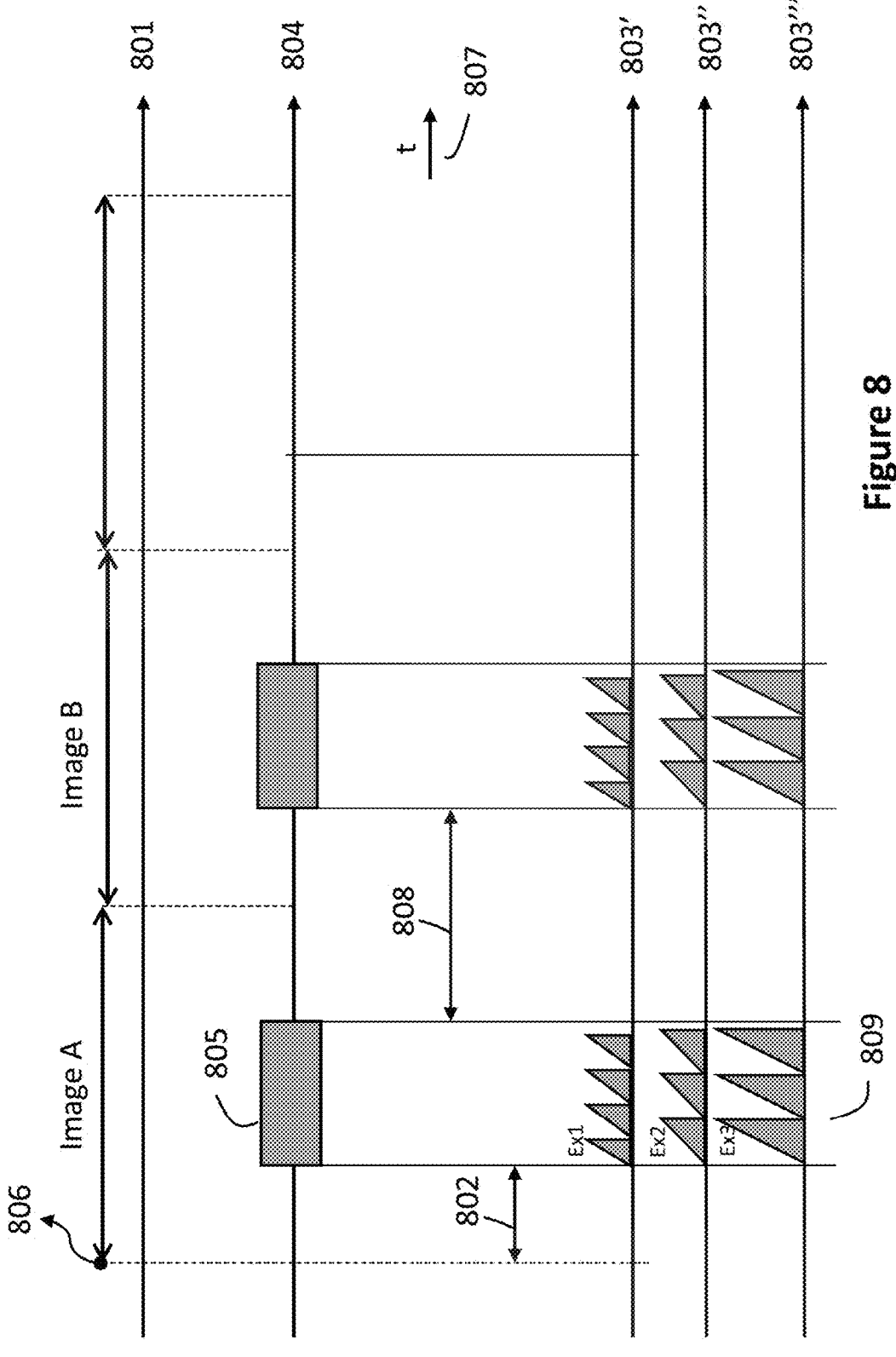
FIG. 8 shows an embodiment for illustrating a few options to define the length of the camera shutter opening time, in accordance with the invention.

As a solution, a few options (4 in total) to define the (maximally possible) length (as function of the display image to be viewed by the camera) of the shutter opening time 805 of the camera 804 are now discussed together with FIG. 8. With the (maximally possible) length is meant that we try to maximize (when desired) the output of the image (for brightness and grayscales) within the shutter opening window 805. By means of example, a LED display is considered and we do have a programmable start and stop for showing the image on the display. An image is given at Sync signal 806 from the video feed or source 801 to be shown. Again the evolution in time being indicated, here by arrow 807. The Programmed delay 802, 808 being the amount of time (before programmable start and after stop) until the viewing time 805 on camera 804 is becoming active (again). Different display time lines 803', 803", 803''' are depicted representing examples Ex1, Ex2, Ex3 of PWM grayscale generation 809 for the display LEDs for corresponding image being shown during the viewing time 805 on camera 804. We start the discussion of the different options while considering display line 803', having a predetermined number of PWM cycles that (almost) fit in the time frame of the camera shutter opening time 805.

Figure 9:
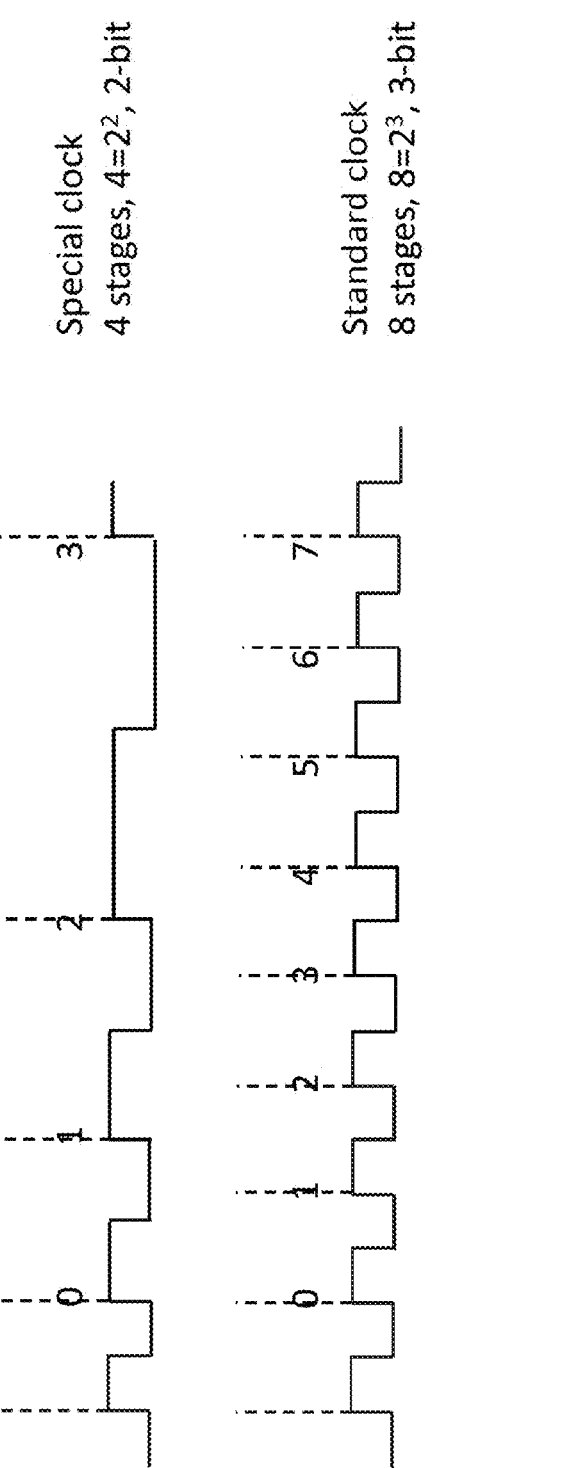
FIG. 9 shows special 2-bit versus standard 3-bit clock representation, wherein the special 2-bit clock is taking into account the human eye sensitivity curve, in accordance with the invention.

Option 1: Changing the Number of PWM Cycles
  a. we can increase or decrease the number of PWM cycles during camera shutter opening time
  b. this will result in more or less PWM peaks
Option 2: Changing the PWM Clock
  a. we keep the number of PWM cycles the same, but we change the clock of the PWM generation
  b. this will result in broadening or narrowing PWM peaks
Option 3: Changing PWM Bit Depth
  a. we change the number of bits to generate the PWM cycles
  b. this will result in higher or lower PWM peaks
Option 4: Using a Special PWM Clock (not Shown in FIG. 8)
  a. for example a special PWM clock is based on a principle for generating grayscales taking into account the human eye sensitivity, which has been earlier disclosed in US2020/0388210 from the same Applicant. In particular can be referred to FIG. 18 thereof, showing an embodiment for illustrating the aspect of greyscale clock in relation to PWM, and therein concluding that "stand alone or a combination of a gamma look up table and modulation of the grey scale clock in frequency during PWM cycle can mathematically give you more than 24 bit of 'grey' scales if one sees it in a linear frequency time domain". By means of using such special PWM clock (representing higher frequency for the low lights where the human eye is the most sensitive for incremental change in color or grayscales—and vice versa lower frequency for the high lights), we may achieve more grayscales and give the impression that we have a larger bit depth for a same amount of bits (see FIG. 9). Using such special PWM clock, an example of PWM grayscale generation (for LEDs) is herewith also presented.
  b. E.g. with less bits used having the impression of more bits being present, by taking into account the human eye sensitivity With FIG. 9, it is clearly depicted that with 2-bit, we do what normally would be done with 3-bit. The special 2-bit clock is taking into account the human eye sensitivity curve, representing higher frequency for the low lights (beginning stages) and lower frequency for the high lights (end stages).

It is noted that the herewith discussed principle of defining the (maximally possible) length for the camera shutter opening time (including the different options therefor as given above) can also be applied when there is no programmed stop defined, as is the case in earlier US2020/0388210. This although may have a slight influence on brightness and potential stability from the point of view of the camera, due to edge effects at the closing point of the camera shutter opening time.

What can be Done Outside the Camera Shutter Opening Time?

Figure 10:
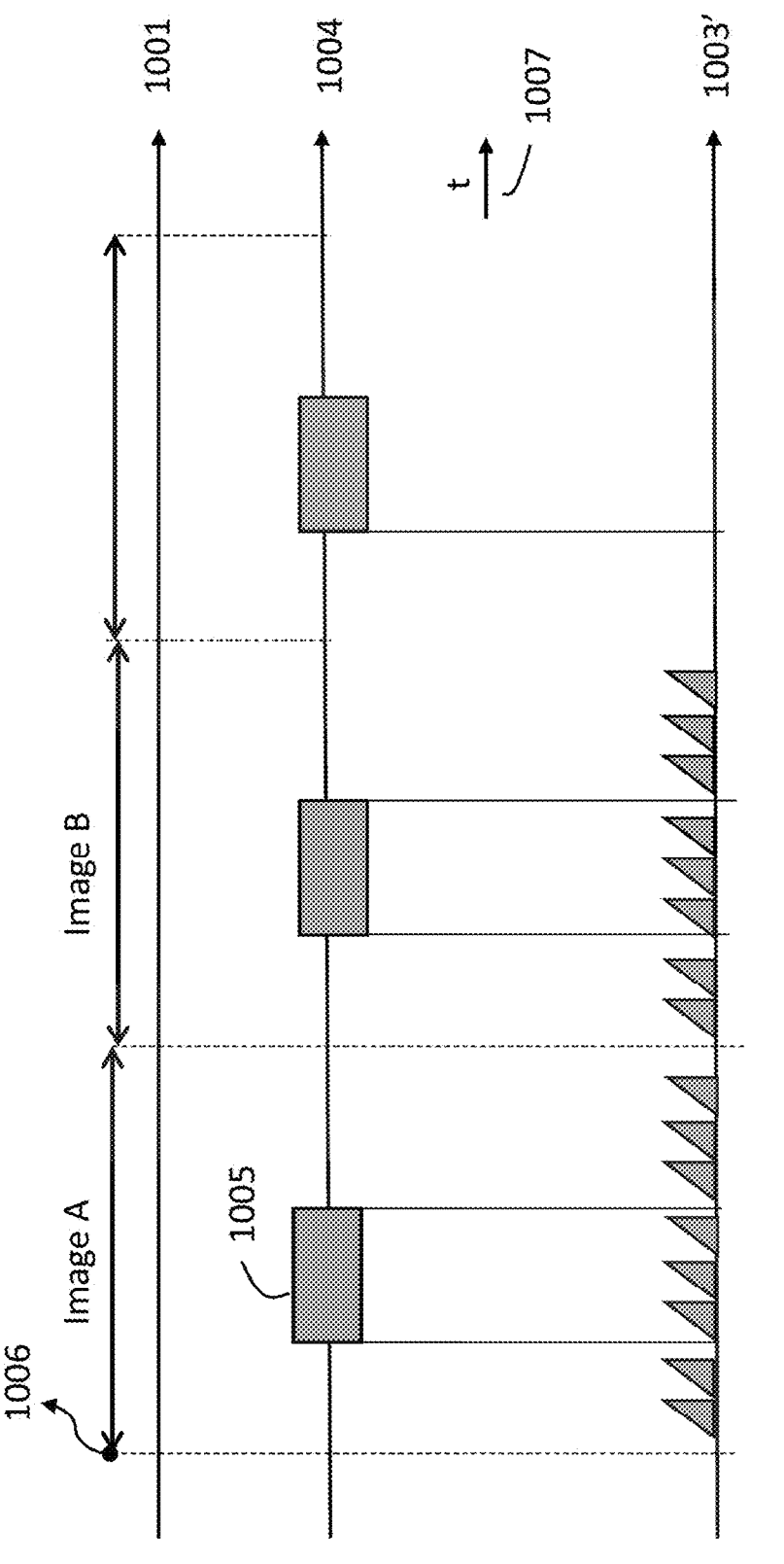
FIG. 10 shows an embodiment in the time domain, illustrating no programmed blank time, nor programmed delay, in accordance with the invention.

When we would continuously show the images on the display, i.e. without using a programmed delay or programmable blank time as described above, we clearly observe as depicted in FIG. 10 that the opening time of the camera shutter only overlaps for some part with the image, hence the camera only views this part of the image generated (or shown on the display) during that particular shutter opening time. Again the evolution in time being indicated, here by arrow 1007. An image is given at Sync signal 1006 from the video feed or source 1001 to be shown. The image will only be shown during the viewing time 1005 on camera 1004, meaning during the camera shutter opening time. The display 1003', representing PWM cycles, starts to generate its image when the Sync signal 1006 comes, however, here the PWM or image is not blanked when the camera shutter is closed, as in FIG. 7.

As described with above, it is although possible to delay or blank part of the image such that only the part being viewed on camera, will also be shown on the display (see FIGS. 6 and 7). Either if we keep the entire image shown on the display or not, the question is in any case, what we can do with this apparently waste image, waste delay or waste blank. It may be asked, could a particular new function be assigned to it, such that it no longer appears to be waste?

With the invention aspects described above (including earlier application US2020/0388210), we have established ways to avoid banding on camera systems, as well as we have described methods for showing only images that are 'visible' for or can be viewed on the camera. Being 'visible' here means that, the 'eyes' (=shutter) of the camera are only open during the shutter opening time of the camera.

According to a further aspect of the invention, when the 'eyes' are only open for a (first) camera during the shutter opening time, this means that during the other time, i.e. the shutter closing time, alternative content could be shown or represented onto the display that is not visible for the (first) camera, but instead such alternative content being visible for e.g. the human eye, an audience, or possibly even for another (second) camera having a different shutter opening time (than the first camera) that does not—or only partly— overlap the original (first) camera shutter opening time.

In practice, to also show alternative content outside the (first) camera shutter opening time, that may be visible to anyone except the (first) camera, this can be arranged as follows: (i) we first e.g. double (internally in the receiver card) the frequency, (ii) we can show the image from the original stream shown on the display for the (first) camera, and (iii) we can show alternative content from e.g. non-volatile memory present in the display. Regarding (i) it may also be necessary to triple or quadruple the frequency, depending on the number of different types of content we would like to show. There is no particular order of appearance regarding (ii) or (iii), so (iii) can go first as well instead of (ii).

What could be the alternative content or how can the alternative content be determined is further described herein.

3.1 Text or Graphics

The receiver card of the display can be programmed (FPGA) for generating graphics on the display. These graphics can be for example text, logo's, markers. In case the PWM generation (or on time of the pixels in the display) is out of the camera shutter opening time window, these graphics cannot be seen by the camera, but are seen for example by the human eye (for which we don't consider a shutter time, just an iris that opens and closes in function of the brightness, so there is integration—i.e. the human eye integrates over time) Application examples can be:

i. Text overlay: for example this type of text may be the (to be) spoken lines actors needs to say in case of a studio installation or set-up, or it can be seen as some kind of auto-queue for a presenter during television broadcasting (e.g. someone presenting the weather forecast).

ii. Text or graphics overlay: in this case text or graphics can be chosen that can indicate for example scoring or statistics during a live (e-)sports event.

iii. Text or graphics may also be used for local branding (e.g. the smaller sponsors during a sponsored event), logo's to be seen by audience, but not (necessarily) on camera 3.2 Locally Stored in Display With locally stored in display is meant for example that the alternative content to be shown on the display can be retrieved in (local) non-volatile memory or data storage being part of or integrated within the display. For this particular feature, we may also refer to earlier patent application WO2019/215219 A1 from the same Applicant, regarding a standalone light-emitting element display tile and method wherein is described that "the control module of the display system comprises of . . . a data storage module, more in particular a non-volatile data storage module wherein e.g. video files and/or images are stored". In other words, graphics, text or (moving/still) images can be stored locally in the controlling system of the display, and these can be triggered to be displayed in accordance with what is described above in paragraph 3, in particular related to paragraph 3.1, as well as possibly relying on the control and data storage system as described in WO2019/215219 A1 or by using an external command.

3.3 Markers for e.g. Screen Alignment

Markers could be provided as alternative content, to be used for example for screen alignment. This could be in the form of text or graphics as described in paragraph 3.1, but it may also be that such markers are not visible for the human eye (as e.g. referred to in paragraph 3.1). The idea of markers is also discussed in earlier patent application US2020/0286424 from the same Applicant, regarding a real-time deformable and transparent display wherein according to an embodiment "more technical space becomes available to provide extra nodes in between the existing LED or pixel nodes of the LED matrix, and herewith offering additional functionality . . . . The extra nodes can also be provided with infrared light emitting elements, or so-called active markers used in an optical tracking system." Further, in US2020/0286424 particular reference is made to possibly "add local infrared markers. Such infrared markers can be interpreted by a processing system wherein feedback is given to the matrix processing side to determine R, G and B". It can also be that the markers are for example to be seen by the audience, but not by the camera. Such markers could also be used for example for angle correction etc.

Figure 11:
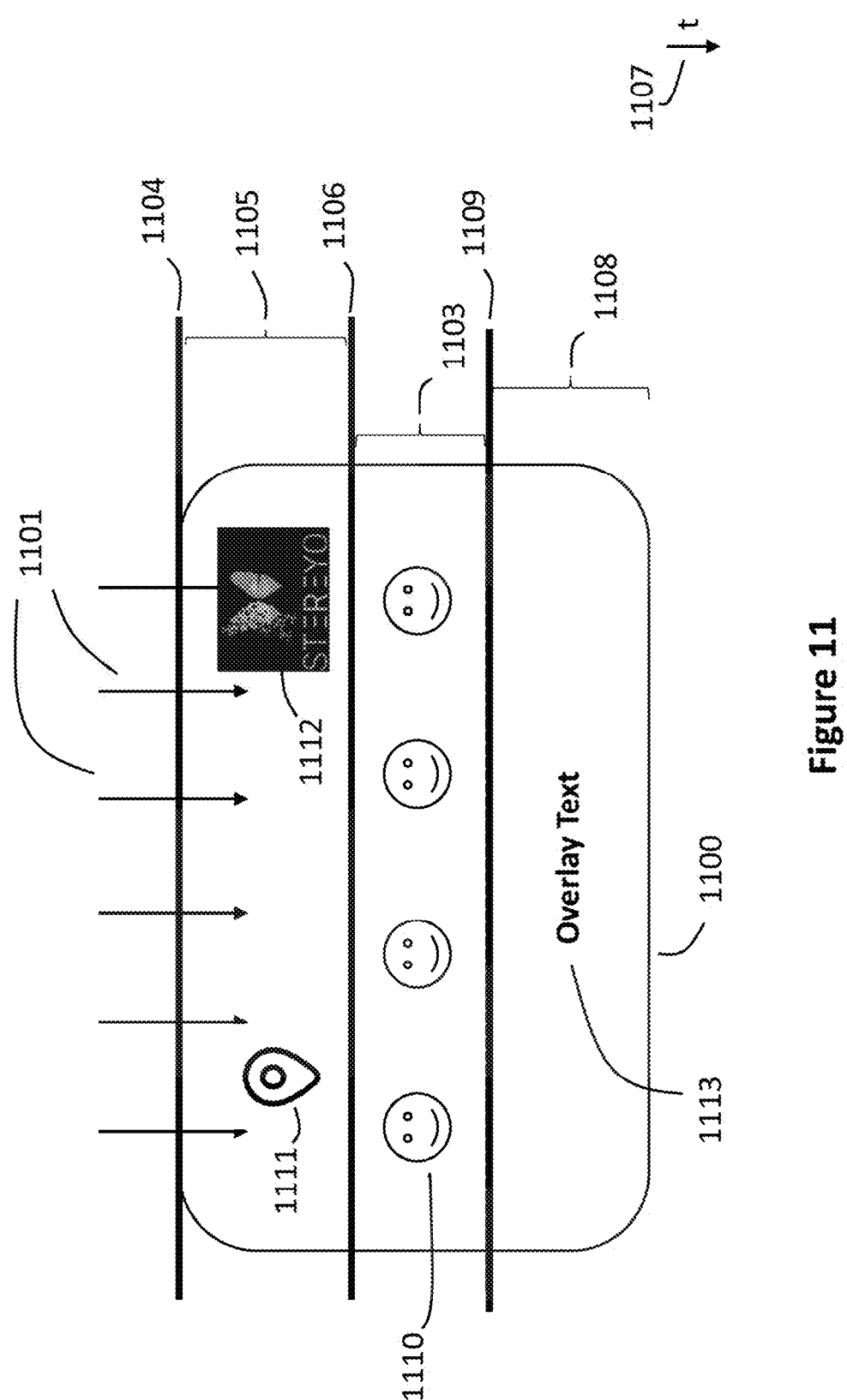
FIG. 11 shows an embodiment illustrating the vertical sync update aspect wherein a programmable start and stop is provided, and wherein content is shown that is either visible or non-visible for the camera, in accordance with the invention.

FIG. 11 shows an embodiment illustrating the vertical sync update aspect wherein a programmable start 1106 and stop 1109 has been provided. Again, a screen or display 1100 is shown, wherein the images or video data comes in or is scanned vertically from top to bottom 1101. To specifically indicate the evolution in time, arrow 1107 is given. During the viewing time 1103 of the camera i.e. within the part or ribbon in between programmable start and stop, the image with faces 1110 shown on the display 1100 are viewed on camera. Outside of this part or ribbon, alternative or further content 1111, 1112, 1113 is also shown onto the display 1100, and hence not visible for the camera. At the Incoming Sync 1004, we delay the start of generation of the image with faces 1110 to where the camera shutter opens, and this for a Programmed delay 1105 time, during which the alternative content 1111, 1112 being represented on the screen 1100 is not 'seen' by the camera because of its closed shutter time. After the programmable end 1109, i.e. when the shutter closes (again), during part or ribbon 1108, further content 1113 is shown on the display 1100, which is not 'seen' by the camera. By means of example, here the alternative content not being visible for (or not 'seen' by) the camera is e.g. a marker 1111, a logo 1112 or overlay text 1113.

Figure 12:
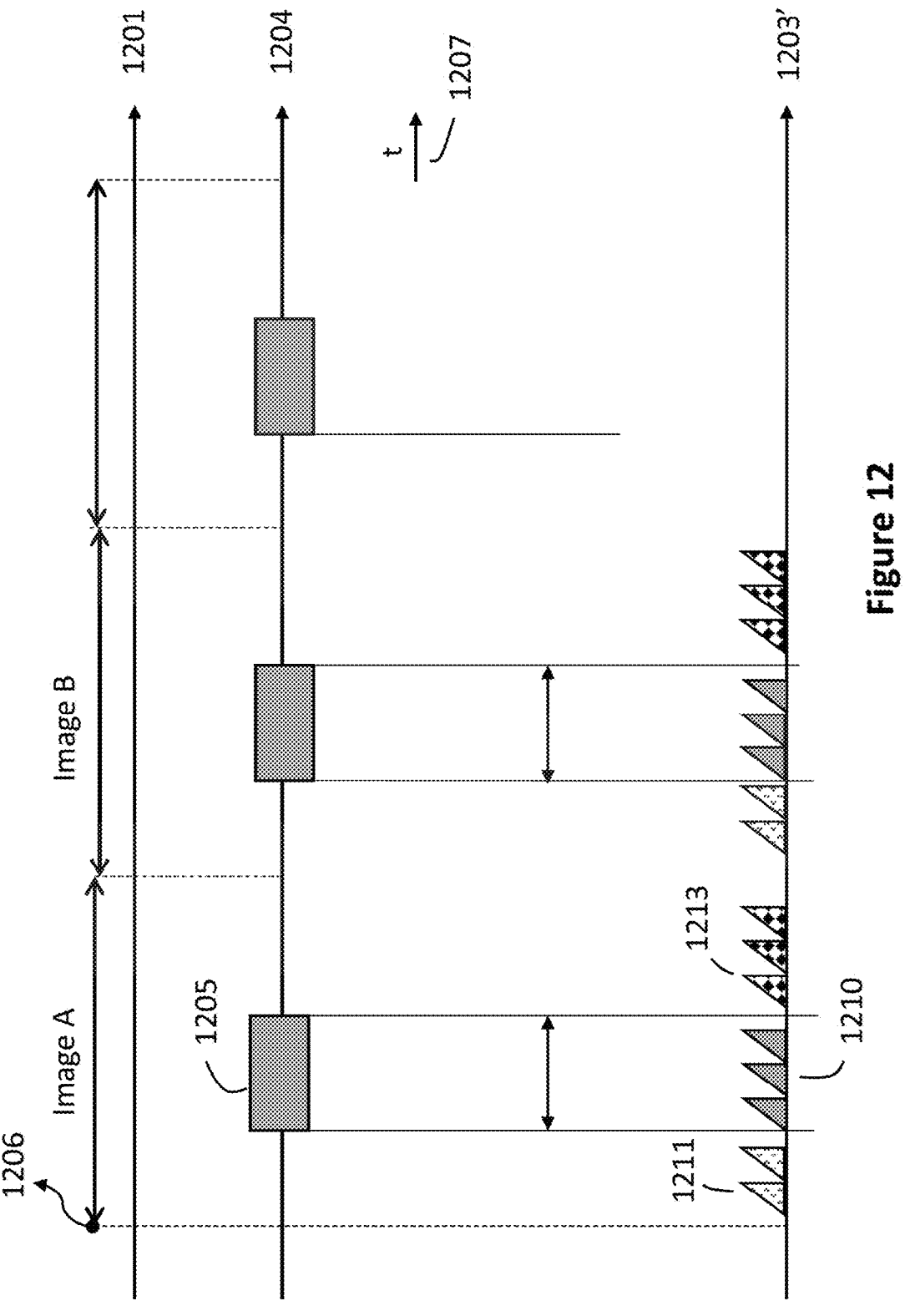
FIG. 12 shows an embodiment of corresponding alternative view in the time domain of FIG. 11, in accordance with the invention.

In addition to FIG. 11, an embodiment with alternative view in the time domain is depicted in FIG. 12. Again the evolution in time being indicated, here by arrow 1207. An image is given at Sync signal 1206 from the video feed or source 1201 to be shown. The image comprises the image with faces 1110 as well as the alternative content 1111, 1112, 1113 as in FIG. 11. The image with faces 1110 will only be shown during the viewing time 1205 on camera 1204, meaning during the camera shutter opening time. The display 1203', representing PWM cycles, starts to generate its image when the Sync signal 1206 comes, although first only showing the alternative content 1111, 1112 not 'seen' by the camera. The PWM 1211 for the alternative content 1111, 1112 not 'seen' by the camera, is represented on the display time line 1203' before the camera shutter opens. During viewing time 1205 on camera 1204, the PWM 1210 for the image with faces 1110 is 'seen' by the camera. Finally, when the camera shutter is closed (again) (and before next Sync signal appears), the PWM 1213 for the alternative content 1113 not 'seen' by the camera, is also given on the display time line 1203'.

3.4 Another (Second) Camera or Multiple Camera System

It may also be possible to provide alternative content that is for example—while being not visible for the first camera—visible for a second camera having a different shutter opening time than the first camera. With different shutter opening time for the second camera is meant either not at all, or else partially overlapping with the first camera shutter opening time. Multiple (alternative) content items could be respectively applicable for (corresponding) multiple cameras in a multiple camera system, wherein each camera has a particular shutter opening time during which at least one of the (alternative) content items may be viewed. This especially when using one display, such that plural content displayed on the display can be viewed by multiple cameras, according to the system as described above, e.g. related to cameras having a different shutter opening time. The use of multiple displays with such multiple camera system is however not excluded.

Having a system with 2 cameras could be seen or interpreted in fact as an extension of the aspect above wherein only one camera is being used, by adding a second camera in addition to the first one.

Figure 13:
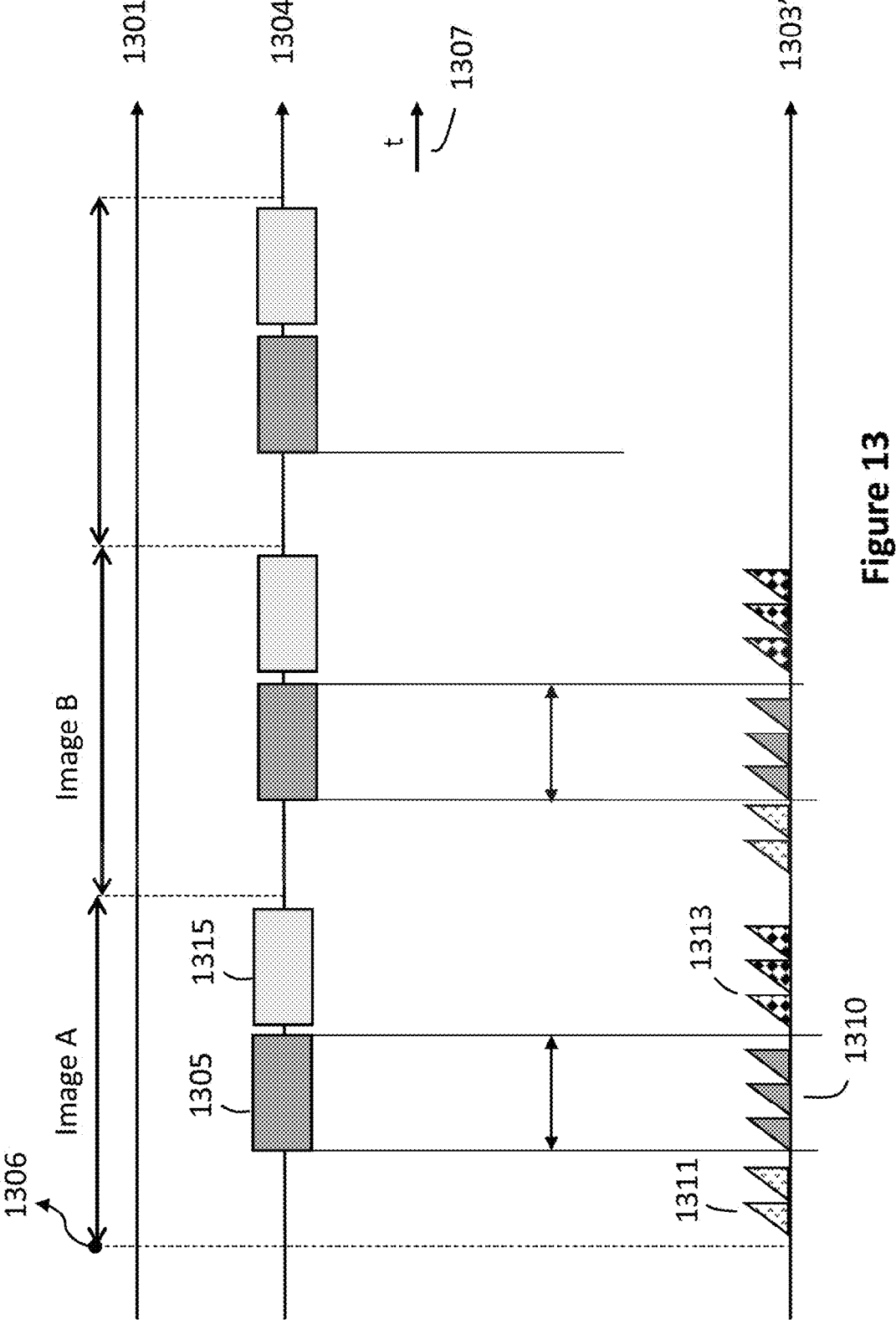
FIG. 13 shows an embodiment in the time domain, illustrating a 2-camera system, in accordance with the invention.

An embodiment of the 2-camera system in time domain view is depicted in FIG. 13. Again the evolution in time being indicated, here by arrow 1307. An image is given at Sync signal 1306 from the video feed or source 1301 to be shown. Here also, the image comprises the image with faces 1110 as well as the alternative content 1111, 1112, 1113 as in FIG. 11. The image with faces 1110 will only be shown during the viewing time 1305 of the first camera (Camera 1) (as depicted on the camera time line 1304), meaning during the first camera shutter opening time. The display 1303', representing PWM cycles, starts to generate its image when the Sync signal 1306 comes, although first only showing the alternative content 1111, 1112 not 'seen' by any of the 2 cameras. The PWM 1311 for the alternative content 1111, 1112 not 'seen' by any of the cameras, is represented on the display time line 1303' before the first camera shutter opens. During viewing time 1305 of the first camera (Camera 1), the PWM 1310 for the image with faces 1110 is 'seen' by the first camera (Camera 1). After the first camera shutter is closed (again), the second camera shutter will open. As represented on the display time line 1303', the PWM 1313 for the alternative content 1113 is not 'seen' by the first camera (Camera 1), but only visible on the second camera (Camera 2) during its corresponding viewing time 1315.

As depicted in FIG. 13, we consider the second camera to have a different shutter opening time 1315 than the first camera. Moreover, here, respective shutter opening times of the 2 cameras are not overlapping, but considered so-called exclusive. In case the shutter opening times of multiple cameras are mutual exclusive (meaning that they are not overlapping in time), it becomes clear that the same display system can be used for displaying images that can be 'seen' by the first camera (Camera 1), but not by the second camera (Camera 2), and vice versa.

From FIG. 13, it also becomes clear that first part of the image, i.e. the alternative content 1111, 1112 comprising logo and marker, can only be 'seen' by another (e.g. human) viewer and not by the any of the 2 cameras. Included in the aspect of the invention is to derive multiple combinations from the 2-camera system example given.

It is further noted that, the image to be viewed on the second camera (Camera 2) can also be taken from a separate (different) video stream (if available) than the one depicted in FIG. 13, or it can be derived from the original video stream 1301 as shown in FIG. 13, or it can even be taken from the display itself, wherein it is for example locally stored (e.g. in the control system of the display as described in earlier patent application WO2019/215219 A1 from the same Applicant).

How to Automatically Determine Start and Length of the Camera Shutter Opening Time Consider the situation that we have a video source for providing images to a display being recorded by a camera. As we yet know, the camera will not view the image all the time, due to its in-built shutter system and corresponding shutter time. Hence, in case of one single image considered for instance, only part—in time—of that image shown on the display will be viewed on the camera. The shutter time of the camera might be provided by an operator or given together with the camera settings, but it is also possible that we don't have any details about it.

In case so, in order to know start and length of the camera shutter opening time, according to a further aspect of the invention, a method is now provided for determining these in an automated manner.

In case we know the start and length of the camera shutter opening time, this also means that we know when/where the (PWM) start of the image has to be positioned in order to have the correct programmable timing (e.g. delay or blank time) for avoiding banding effects. We earlier (with the discussion of FIG. 1 in accordance with the art and extracted from previous application US2020/0286424) referred to so-called sync banding (adjustment) as a synchronization solution for avoiding banding effects.

Hence, with the method for automatically determining start and length of the camera shutter opening time, we can also define a method for sync banding adjustment, or else for adjusting sync banding automatically.

As part of the solution for these methods, we not only refer to the use of a (first) video stream for providing images to the display, but also make use of a (second) video stream we hook up to the camera system while using the (second) video stream not for displaying, but for control or adjustment (in particular positioning adjustment of the (PWM) start of the image to be viewed on camera, or, more generally spoken, for sync banding adjustment).

Alternatively, the system may make use of the (first) main video channel to make all the adjustments, but for the sake of easy reasoning, we assume the control system of the display has a test pattern generator for generating easy test patterns (which we could use as a virtual (second) video channel). Whereas the provided solution or method discussed is not limited to using a test pattern, we prefer referring to it for the sake of clarity and easier explanation.

Consider the camera looking at the display or screen, and recording the image shown thereon. The video stream for providing images to the display can also be referred to as primary (video) input. We assume a camera system wherein the camera output is hooked up (connected e.g. cabled or wireless) to the (display) processor with secondary (video) input, being the output images (or video) from the camera. We also assume a (video) circuit for analyzing the images of the secondary input.

Figure 14:
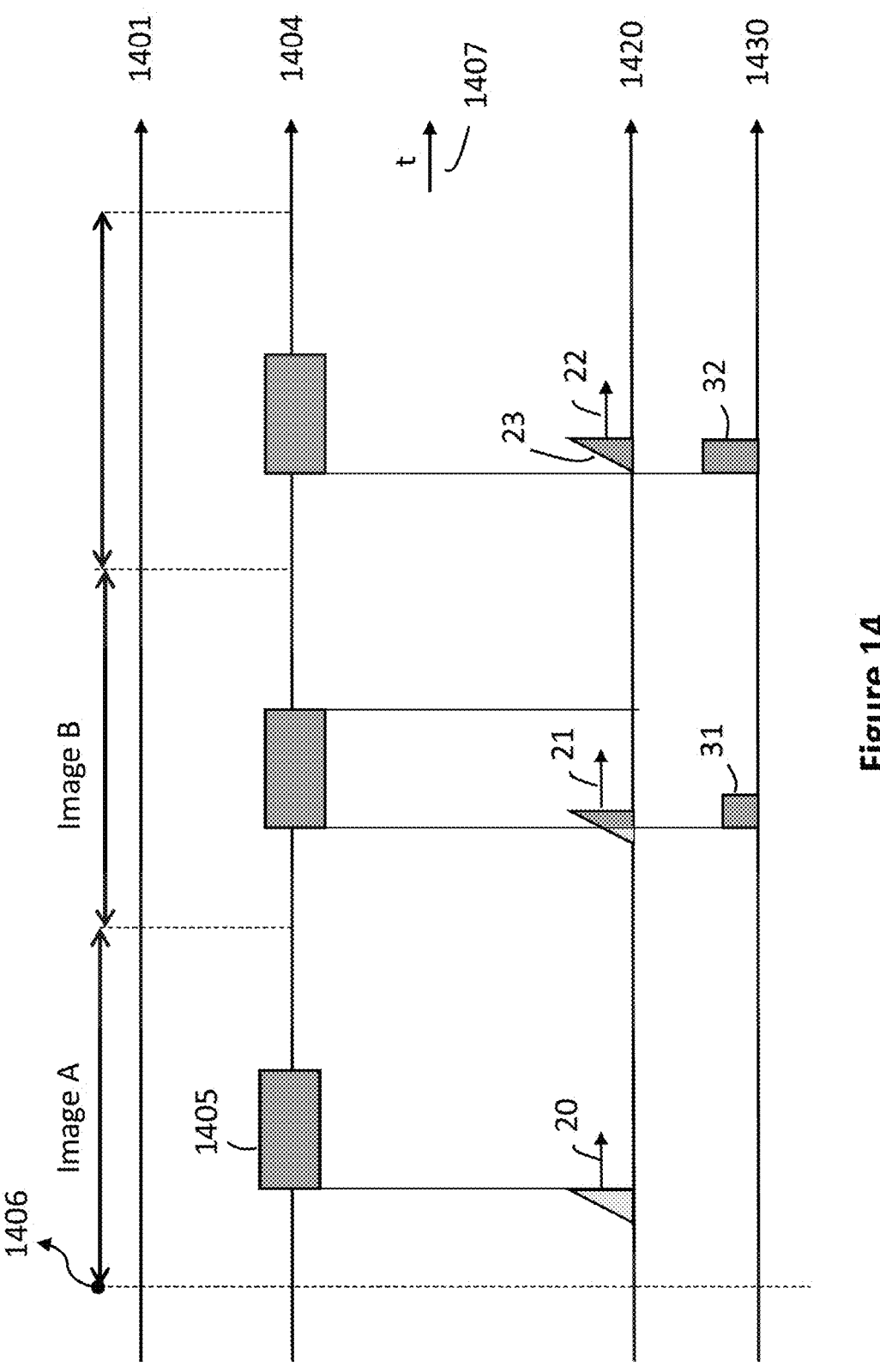
FIG. 14 shows an embodiment in the time domain, illustrating sync banding adjustment, in accordance with the invention.

An embodiment of the method for sync banding adjustment in time domain view is depicted in FIG. 14. Again the evolution in time being indicated, here by arrow 1407. An image is given at Sync signal 1406 from the video feed or source 1401, considered as primary input for the display, to be shown. The camera time line 1404 is depicted together with its viewing time 1405 or camera shutter opening time. The display time line 1420, representing PWM cycle of the image, a predefined image e.g. test pattern (being shifted in/over time as indicated by arrows 20, 21, 22) until it falls entirely within the camera shutter opening time 1405, which can be determined by analyzing the camera output 1430, considered as secondary input for the display. The reference to a predefined image is made in order to avoid that a black screen would for example be displayed, which of course makes it rather difficult to perform the adjustment as described here.

Next, the method may comprise of the following steps:

i. Step 1: displaying arbitrary image with defined ON time (or PWM time), meaning when e.g. LEDs are lightened up such that the arbitrary image can be seen on the display. Preferably start with narrow PWM time as e.g. depicted in FIG. 14, wherein only one PWM cycle (hence narrow PWM time) is given per image.

ii. Step 2: gradually changing timing or position in time of the ON time or PWM cycle using principle of programmable timing (e.g. delay or blank time) as known from above (including reference to earlier US2020/0286424).

iii. Step 3: analyzing the camera output image (image as shown on the display and viewed by the camera) for each of the positions during the gradually changing thereof in Step 2. This analysis of the camera output image is schematically illustrated by the camera signal time line in FIG. 14. It is noted that the 'shape' (here rectangular) of the camera signal is dependent on the content (e.g. test signal) shown on the display. Moreover is noted that the intensity will change on the camera when the ON time or PWM time moves fully into the shutter opening window. Hence, the difference in height amongst camera outputs 31, 32 wherein camera output 32 is clearly the strongest signal and herewith PWM cycle 23 falls entirely within the camera viewing time 1405.

iv. Step 4: using this camera measurements and the moving or gradually changing of timings, it becomes possible to determine when (referring to timing)/where (referring to position in time) the so-called sync band (i.e. synchronization of display image start with shutter opening start) starts, or else when/where the camera shutter opening time starts and when/where it ends.

v. Step 5: using one or more of the options to define the (maximally possible) length of the shutter opening time of the camera as described earlier under paragraph 2, in order to maximize (when desired) the output of image (for brightness and grayscales) within the opening window.

Automatic Color Adjustment

We know from experience that the colors of an image shown on the display are not necessarily the same as the ones viewed by the camera recording the image from the display.

We earlier referred to this problem in patent application publication US2020/0388210, in [0089] while referring to FIG. 14 therein as briefly described in [0047]. Herewith, we also proposed a solution as described in [0091] while adapting the screen side or the LED-display or LED-wall itself.

In the same patent application publication US2020/0388210, it is also discussed in [0064]-[0066] the aspect of current (I) setting for the individual colors (instead of PWM tuning) for achieving required color spectrum or light output.

Figure 15:
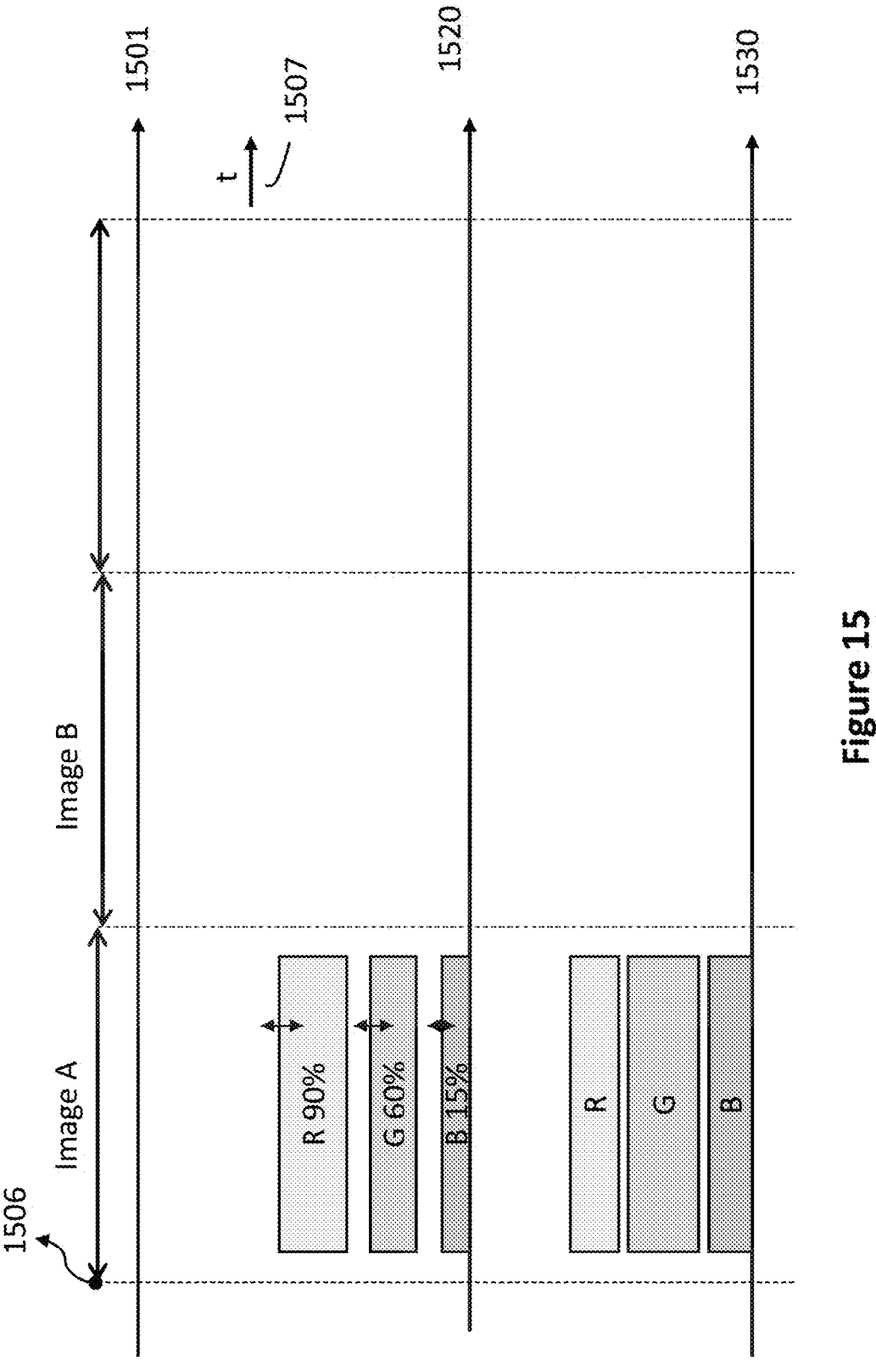
FIG. 15 shows an embodiment of the method for automatic color adjustment in time domain view, in accordance with the invention.
Figure 16:
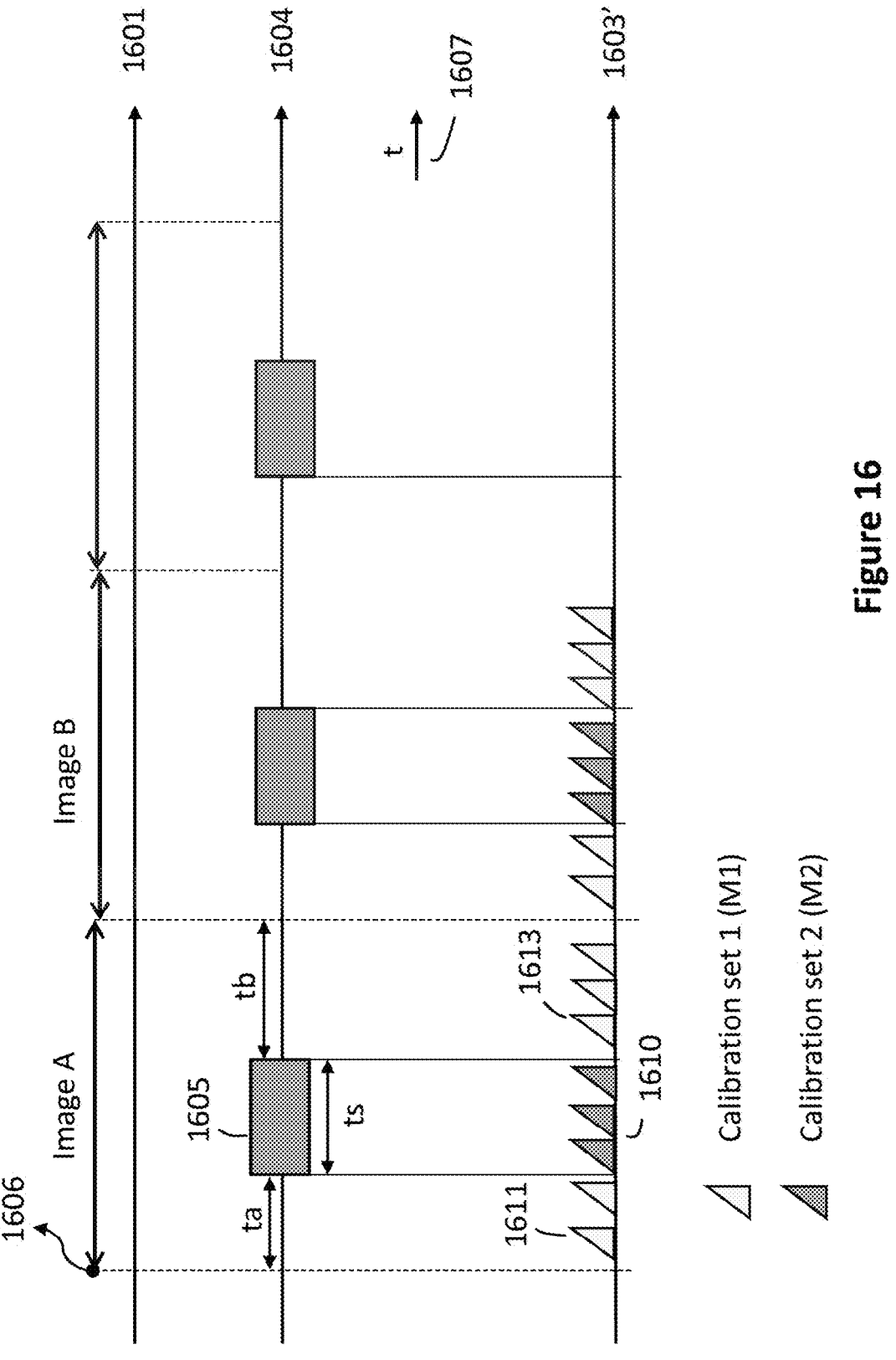
FIG. 16 shows an embodiment in the time domain, illustrating the principle of calibration sets and time dependent calibration, in accordance with the invention.

And further from US2020/0388210, the illustrations in FIGS. 15A and 15B, and FIG. 16 as referred to in [0048] and [0049] respectively, are based on the principle of metamerism.

In addition to the solutions earlier provided in US2020/0388210, a further color adjustment may be performed automatically when connecting the camera to the display, as proposed with present invention.

In accordance with an aspect of the invention, we herewith describe a method for (further) adjusting color sensitivity of the camera to desired levels, to be applied for improving the accuracy. It is particularly noted that the camera being connected now to the display. It is also noted again that banding effects typically occur when the camera shutter opening time is not in line in time with (the start of) the (PWM) signal or image shown on the display.

The method comprises of a quick attempt to adjust the primary color gains of the display to match with the desired output of the camera (as opposed to performing a spectral analysis as described with the solution earlier provided in US2020/0388210). As referred to yet, it is well known that the camera color sensitivity isn't necessarily matched or the same compared to the display emitting its light.

An embodiment of the method for automatic color adjustment in time domain view is depicted in FIG. 15. Again the evolution in time being indicated, here by arrow 1507. An image is given at Sync signal 1506 from the video feed or source 1501 to be shown. The display time line 1520 and camera signal time line 1530 are also depicted here. For each image being displayed, the (R/G/B) colors can be adjusted (one by one) at the display side in order to achieve the desired (R/G/B) color intensities for the camera output. In other words, the automatic color adjustment on camera is performed by adaptation at the display side. The automatic way of doing so is enabled by connecting the camera with the display, and herewith creating a feedback loop.

Consider again the camera looking at the display (now being connected thereto), and recording the image shown thereon. The video stream for providing images to the display can also be referred to as primary (video) input. We assume again a camera system wherein the camera output is hooked up to the (display) processor with secondary (video) input, being the output images (or video) from the camera. We also assume again a (video) circuit for analyzing the images of the secondary input. We further assume that the desired R/G/B signal output relationship is known for the camera. E.g. for D3200 color temperature, the pure R (red) needs to be 90%, G (green) 60% and B (blue) 15% as being emitted by the display as illustrated for first image on the display time line 1520 in FIG. 15. The camera signal output 1530 differs from the display intensities such that the desired and correct colors are perceived by someone looking at the camera output, either directly (on camera) or indirectly (e.g. broadcasted).

The method may further comprise of the following steps:

i. Step 1: showing (sequentially) R/G/B test pattern on the display (using a fixed set of desired target points (calibrated or not) on the display; this can be a set of target points that is needed for human eye accuracy)

ii. Step 2: adjusting the R/G/B intensities of the camera (while analyzing the Camera signal output) with the individual and respective R/G/B from the R/G/B test pattern iii. Step 3: measuring intensities of the subsequent R/G/B images coming from camera (via Camera signal)

iv. Step 4: repeating Step 2 until R/G/B intensities are the desired level (known from the display)

Figure 21:
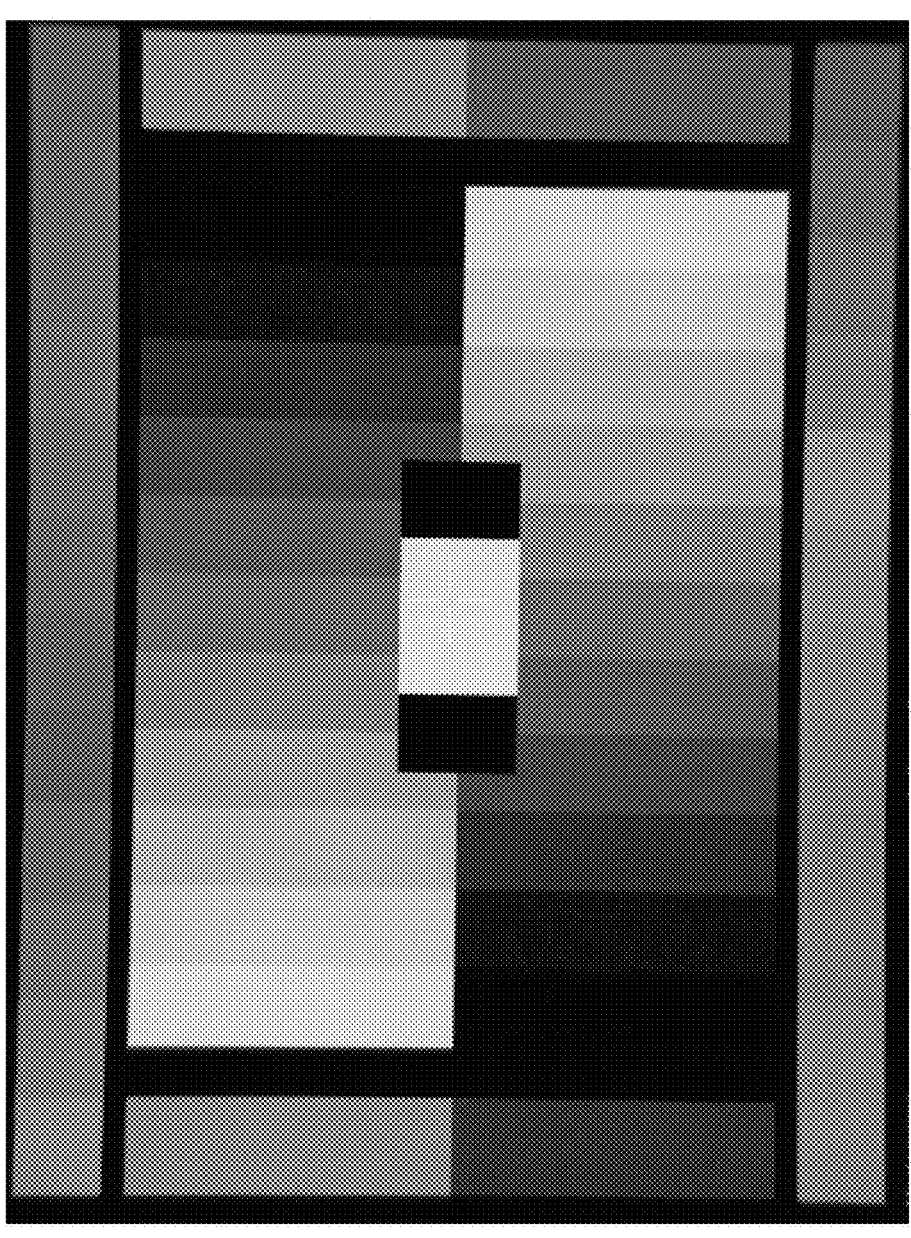
FIG. 21 shows a multicolor bitmap, as for example typically used in studio applications.

Whereas the above regarding automatic color adjustment and the illustration in FIG. 15 herewith, is described for adapting the R/G/B intensities for/per one single color, this idea could also be extended to multiple colors. An embodiment is now given, for these multiple colors, while referring to FIG. 21, representing a multicolor bitmap (test pattern) as e.g. typically used in studio applications. Considering now such multicolor bitmap and having it saved or stored in the processor of the display. The (display) processor sends or transmits this bitmap or image to the display. The camera is looking at this multicolor image shown on the display. The camera is connected with this (display) processor, such that the image on camera can be compared with the stored or saved bitmap of the processor. The image, or the multiple colors represented herewith, on camera or seen by the camera has to correspond with the saved or stored multicolor bitmap on the processor. In order to achieve this, adaptations on the display are made related to gamma (individual gamma curves), brightness or any other (color) conversion. It is further noted that, instead of the bitmap as a whole, one could also check color per color of the bitmap, and make the adaptations color per color.

According to an embodiment, instead of adjusting color, the camera feedback can be used to adjust the geometry (e.g. straighten or align image) so that the image shown on the display is matched to the desired image to be viewed on the camera, and vice versa. This might include a geometric warper as known in the art, in the processing (cannot be done 100% in tiles).

According to further embodiment, instead of adjusting color or geometry, the camera feedback can be used for correcting brightness and color variation under an angle.

This can occur for example when using a curved display as referred e.g. in earlier patent application US2020/0388210, in [0084] and FIG. 11 herewith discussed.

In case of for example a curved LED screen being used, the brightness and or colors may vary according to the position of the individual pixels in the screen, in relation to the camera. The fact that the screen being curved may have significant impact on the colors and brightness perceived (either by a camera or the human eye) from a particular position, hence under a certain angle, as compared to e.g. looking at or recording from a flat screen, from the same position (leading automatically to another viewing angle).

In another earlier patent application US2020/0286424, we have described a calibration method for viewing angle compensation, in [0009] and [0047] in particular thereof.

Time Dependent Calibration

We have seen and discussed above that—due to camera shutter opening time—there is a 'period' in a frame (or multiple frames), or in an image as we previously mentioned, wherein the camera 'sees the PWM or pixel ON time' of the image shown on the display, and we now also know that during that other time (i.e. outside the camera shutter opening time), the camera 'sees nothing'. However, when the camera 'sees nothing' it is possible that the human eye (e.g. referring to the audience in a studio environment) still sees, and it is so that the human eye sees the full duration of the frame and integrates the colors over time in the frame.

The question is however, in case both camera and human eye are seeing during a certain period, if they both see the images (or video or content in general) correctly. And, if not, how a correction or calibration should be performed for achieving the correct representation of the images as we want to see (as an audience with our eyes), and as to be viewed on camera.

The proposed solution here, according to an aspect of the invention, relates to setting the right colors (in (x, y, Y) space) for on camera and the human eye at the same time using the same set of LEDs.

It is noted that this setting can even be done locally for some part of the display or screen, and thus not necessarily entirely for the whole display or screen.

This basic principle of the proposed solution can be related somehow to a calibration method as earlier described in patent application US2020/0286424 from the same Applicant (see e.g. [0008]-[0012] herein), in particular the content dependent calibration being described therein including the mathematics (using matrices) used therefor. Similar mathematics (using matrices) can now be applied again while referring to or using now the factor time. Hence, the solution is called time (or timing) dependent calibration. The final idea regarding calibration is to—not only—dynamically change the calibration dependent on the content (for improving visual perception) but also dynamically change it over time.

As illustrated and mentioned many times before, we consider generally the case of one single frame for describing both problem and solution with (different aspects of) the present invention.

However, we also refer to the possible use of multiple frames, whereas, in case we can't do the calibration in one single frame, we might want to use the integration over multiple frames. In such case, it is even possible that per frame in a set of multiple frames, we apply (alternatingly) the same or different (content) dependent calibration. The use of multiple frames might be needed in case the shutter time is longer than one frame.

An embodiment of the method for time dependent calibration in time domain view is depicted in FIG. 16. Again the evolution in time being indicated, here by arrow 1607. An image is given at Sync signal 1606 from the video feed or source 1601 to be shown. The image will only be shown on camera during its viewing time 1605 as indicated on the camera time line 1604, meaning during the camera shutter opening time also denoted as ts. The display 1603', representing PWM cycles, starts to generate its image when the Sync signal 1606 comes, and first showing content during a time ta which cannot be 'seen' by the camera. It is noted, the time between 2 sync signals is called a frame, meaning that a frame time in picture is ta+ts+tb. The PWM 1611 for this content not 'seen' by the camera, is represented on the display time line 1603' before the camera shutter opens. During the camera shutter opening time ts, the PWM 1610 for the image is 'seen' by the camera. Finally, when the camera shutter is closed again and before next Sync signal appears, during a time tb, the PWM 1613 for further content not visible the camera, is also given on the display time line 1603'.

The principle of the solution is further described as follows. One calibrates with a different set of calibration parameters (represented by matrix M2) during the camera shutter opening time ts. It is noted that calibration or calibrating here means, changing the primary colors, such that the 'camera sees' the desired color set. It is noted that the brightness, individual gamma curves may be changed or any other color conversion may be applied here (as mentioned earlier). Herewith can for example be referred to previous aspect of the invention in paragraph 5 regarding automatic color adjustment, as a potential system to set to the right colors for on camera.

During the shutter opening time window ts, we set the calibration matrix to M2. This can be e.g. a setting with primaries to rec709 and white point of D32, as 'seen' by camera.

Out of the shutter opening time window ta and tb, we set the calibration matrix to M1.

Consider the user (human eye) sees the full duration of the frame or image, and hence $$Muser=M2\times ts+M1\times(ta+tb)$$

We assume e.g. the user or human viewer wants to see PAL color primaries at D65. Since we have already set M2 and we have a desire to have Muser (what we want that the human viewer sees), then M1 is easily calculated:

$$M1=(Muser-M2\times ts)/(ta+tb)$$

A final calibration formula (with matrices) comprising both content and time dependent calibration could be for example:

$$Mfinal=Ta\cdot Ma+(1-Ta)\cdot Mb$$

Wherein:

Mfinal is the final calibration matrix

Ta=0 or 1 depending on the position in the frame (i.e. Ta being time dependent part)

Ma=F·MA1+(1−F)·MB1

Mb=F·MA2+(1−F)·MB2

Ma, Mb are calibration matrices being calculated for content dependent calibration F being the content dependent part, the so-called Factor MA1, MA2, MB1, MB2 individual calibration matrices being used for the content dependent calibration calculation of Ma, Mb Using the content dependent part F, instead of 'morphing' between 2 matrices and in case we don't want to add lots of (e.g. FPGA) hardware, we may add a so-called hard switch to the hardware to fix the calculation to either Ma or Mb dependent on the timing Ta. Hence, an embodiment to make this calibration functional is to reuse e.g. the content dependent calibration process wherein the content dependent factor F calculation is replaced by a time dependent factor Ta calculation, in which Ta either choses Ma or Mb dependent on the current time within the frame, i.e. for example Ta=1 when in ts Ma=M2, and Ta=0 when in ta or tb Mb=M1.

How to take into account time dependent calibration as discussed above using traditional off-the-shelve Macroblock LED drivers for a LED display is further described below.

One solution can be that we use the programmable delay and double the internal frame frequency also called (internal) frame multiplication (hence comprising a first and second part) compared to the incoming sync frequency. We make sure the camera shutter opening time window is only in the first part of the double frequency and apply the calibration set to be used for the camera (M2). For the other or second part of the double frequency we use the other calibration set (M1).

Applying time dependent calibration when using more than one camera, for example 2 cameras or a multiple camera system, the mathematics can be derived as follows.

Figure 17:
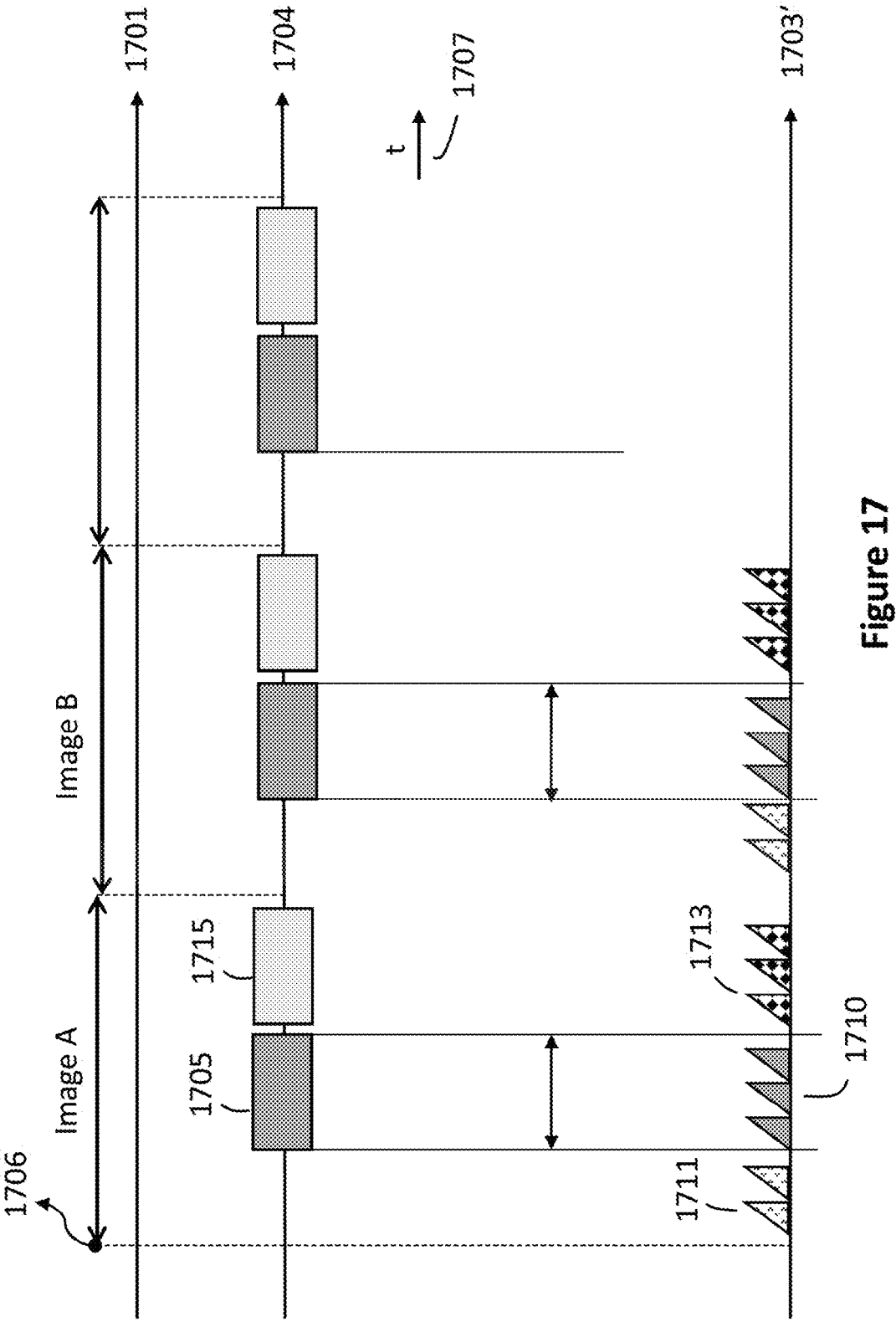
FIG. 17 shows an embodiment in the time domain of the principle of calibration sets and time dependent calibration in case of a 2-camera system, in accordance with the invention.

An embodiment of the method for time dependent calibration with 2 cameras in time domain view is depicted in FIG. 17, wherein e.g. 3 calibration sets I, II and III determined by the matrices MI, MII and MIII can be defined for calculating the time dependent calibration. The evolution in time being indicated, here by arrow 1707. An image is given at Sync signal 1706 from the video feed or source 1701 to be shown. The image will only be shown respectively on the first camera (Camera1) during corresponding viewing time 1705, and on the second camera (Camera2) during corresponding viewing time 1715 as indicated on the camera time line 1704. The display 1703', representing PWM cycles, starts to generate its image when the Sync signal 1706 comes, and first showing content which cannot be 'seen' by any of the 2 cameras. The PWM 1711 for this content not 'seen' by the camera, is forming a basis for the calibration matrix MI. During viewing time 1705 of the first camera (Camera 1), the PWM 1710 for the image is 'seen' by the camera, and forming a basis for the calibration matrix MII. After the first camera shutter is closed (again), the second camera shutter will open. As represented on the display time line 1703', the PWM 1713 is not 'seen' by the first camera (Camera 1), but only visible on the second camera (Camera 2) during its corresponding viewing time 1715, and forming a basis for the calibration matrix MIII.

ADDITIONAL EMBODIMENT

It is noted that during the camera shutter opening time, it may also be possible to change gamma, brightness (could also be enabled by changing the calibration matrices) and/or any other processing that has an effect on the video output during this camera shutter opening time.

Hence, according to an embodiment, a method is provided for improving the interplay of a light source display with a camera recording the image displayed by the light source display, the method comprising the steps of: (i) receiving a light source display input signal; (ii) receiving one or more values representing a programmable parameter that has an effect on the video output like gamma, brightness; and (iii) applying (directly or indirectly by changing the calibration matrices) said light source display input signal to said light source display, based on said one or more programmable values (during the camera shutter opening time), wherein said one or more programmable values are automatically optimally determined, by means of applying the following steps: (a) displaying an image; (b) changing said one or more programmable values; (c) analyzing the recording of said image on said camera in accordance with step (iii) above for each of the one or more programmable values during said changing thereof in (b); and (d) using this analyzing for determining suitable programmable values.

Practical Implementation of the Invention

Consider for example studio recording wherein three different cameras are used, each having a different background setting. The actors present on the set, are playing a scene, which is the same for each camera, except maybe the point of view which can be different for each of the cameras. The actors can thus be seen in three different background settings. As a result, with one act taking, it can be decided afterwards, which of the three background settings is used for this single act. In other words, multiple use or a degree of selectivity, can be induced this way, which may result in cost saving for studio applications.

Figure 18:
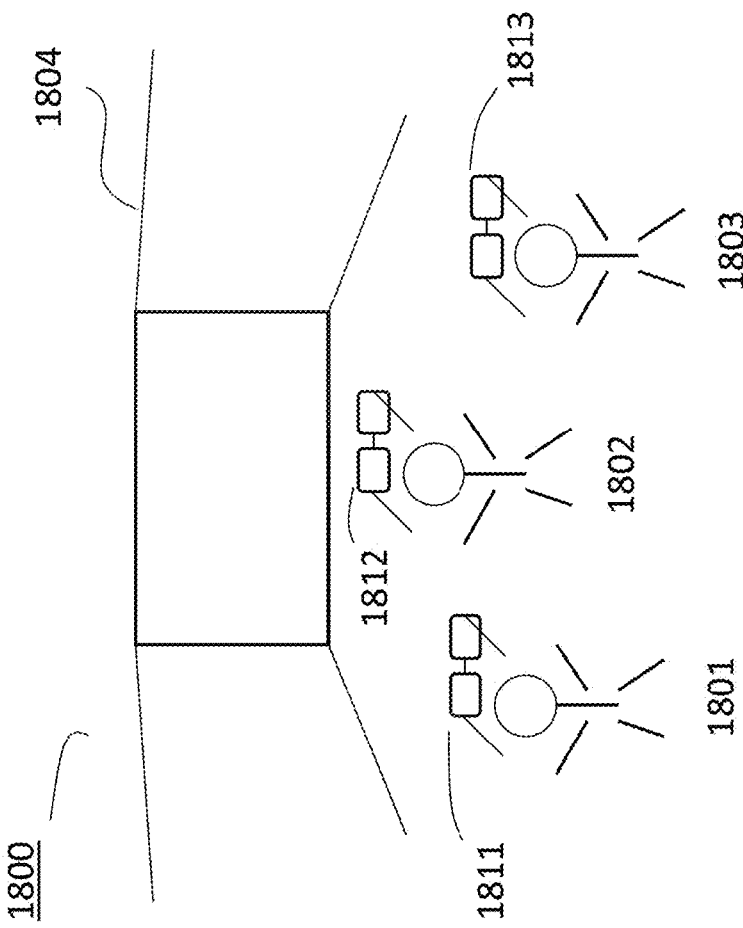
FIG. 18 shows an embodiment of a gaming area, in accordance with the invention.

Instead of referring to three different cameras in a studio environment, one could also think of the situation of a gaming area 1800 wherein for instance three persons or gamers 1801, 1802, 1803 wearing AR/VR glasses 18011, 1812, 1813 are present, as illustrated in FIG. 18. The glasses can be pre-programmed to have a shutter opening time. First, without taking into account the stereo vision, we can consider the situation in this gaming area provided with one or more gaming area screens 1804, that for example a signal is transmitted, now towards the glasses instead of the cameras as we had before, such that the first gamer 1801 is first seeing certain images through his first glasses 1811, then the second gamer 1802 though his second glasses 1812, and later on the third gamer 1803 via his third glasses 1813. The shutter opening time of each of the glasses is different, and not overlapping, such that the gamers are shown (and hence seeing) the images not at the same time but consecutively or rather one after the other.

Figure 19:
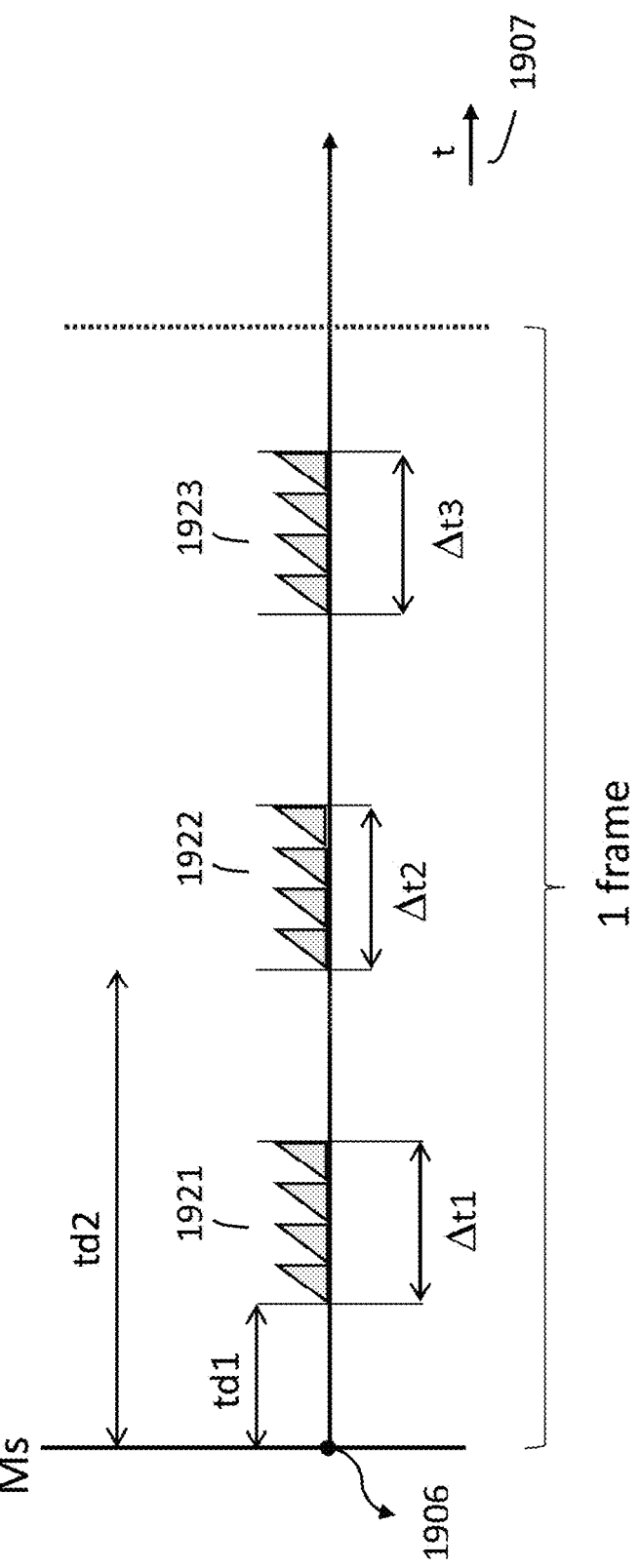
FIG. 19 shows an embodiment in the time domain, illustrating shutter opening times of the gamers' glasses used in the gaming area of FIG. 18, in accordance with the invention.

This is now further explained with the time domain view as depicted in FIG. 19, wherein three shutter opening times $\Delta t1$, $\Delta t2$ and $\Delta t3$ are illustrated, one for each of the three glasses 1811, 1812, 1813 worn by the three respective gamers 1801, 1802, 1803. The evolution in time being indicated, here by arrow 1907. An image is given at Sync signal 1906, or as indicated by Ms, from the video feed or source to be shown. The shutter opening times $\Delta t1$, $\Delta t2$ and $\Delta t3$ appear here are more or less the same, but this is not necessarily the case. They can be really different as well. During the shutter opening times $\Delta t1$, $\Delta t2$ and $\Delta t3$, images are shown, here respectively image 1921 for the first gamer 1801, then image 1922 for the second gamer 1802, and later image 1923 for the third gamer 1803, and this for the one video frame that is shown at that moment. The images are not shown immediately at sync, but for example image 1921 for the first gamer 1801 is shown after a time td1 from the sync Ms, while image 1922 for the second gamer 1802 will be shown after a time td2. It is moreover noted that, during each of the shutter opening times, the respective images to be shown should be present, and hence the image may start a little earlier (before the shutter opening time), or end a little later (after the shutter opening time), but in no case, there is an overlap between the shutter opening time of one pair of glasses with that of another one.

Figure 20:
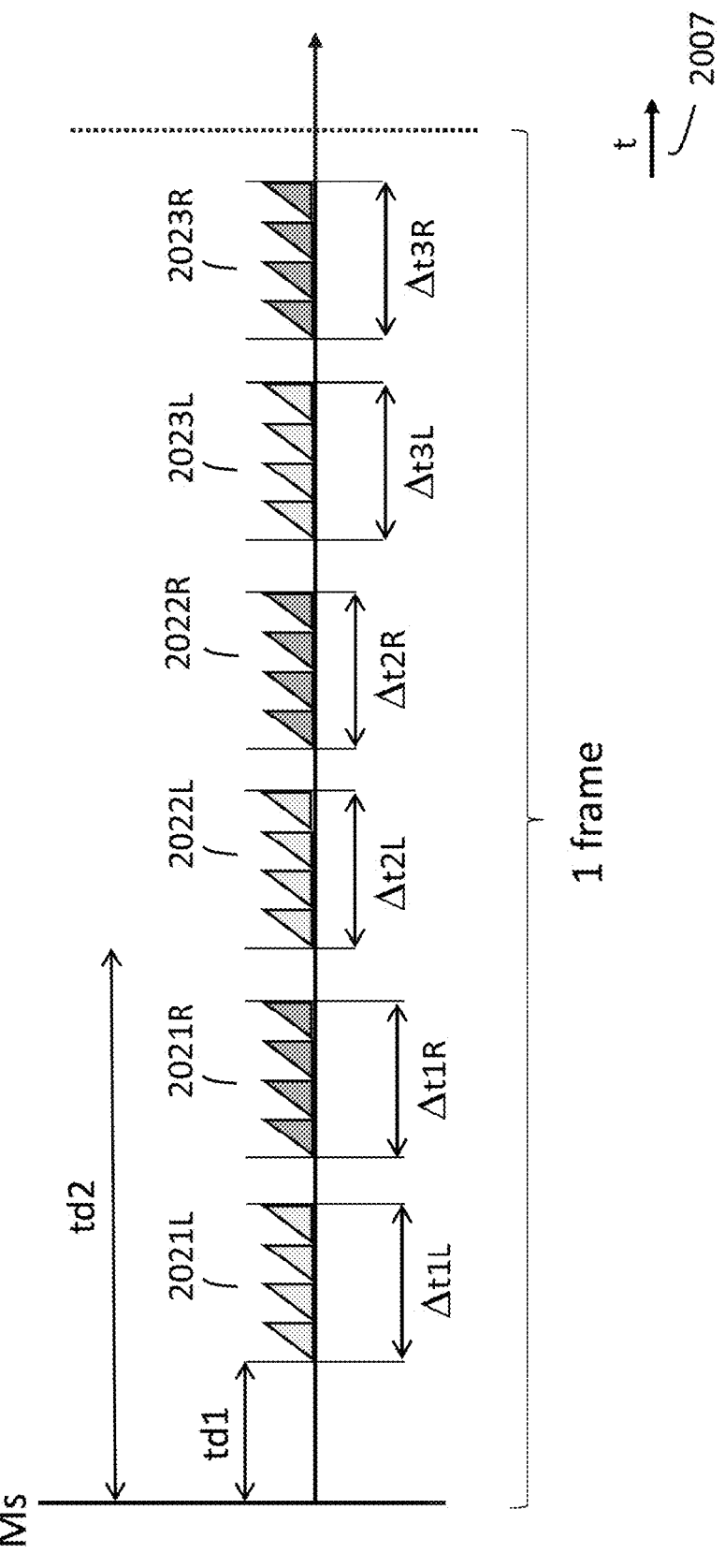
FIG. 20 shows an embodiment in the time domain, illustrating shutter opening times of the gamers' glasses with stereo vision used in the gaming area of FIG. 18, in accordance with the invention.

These AR/VR glasses are for example active 3D glasses by means of which stereo vision is generated by means of alternating signals for left and right eye, hence via left and right glass respectively. In other words, the glasses can be split up in a left and a right glass, having a shutter opening time for the left and for the right glass, respectively showing the image for the left and the right eye. In FIG. 20, this is represented in the time domain again, wherein now six shutter opening times $\Delta t1L$, $\Delta t1R$, $\Delta t2L$, $\Delta t2R$, $\Delta t3L$ and $\Delta t3R$ are illustrated, one for each left and right glass and for each of the three glasses 1811, 1812, 1813 worn by the three respective gamers 1801, 1802, 1803, and this for the one video frame that is shown at that moment. The evolution in time being indicated, here by arrow 2007. An image is given at Sync signal as indicated by Ms, from the video feed or source to be shown. All shutter opening times appear here are more or less the same, but this is not necessarily the case. They can be really different as well. After time td1 from the Sync signal Ms, the left eye of the first gamer 1801 is first shown the image 2021L, whereafter the image 2021R for his right eye will be shown. Next, after a time td2, the image for the eyes of the second gamer 1802 will be shown, starting again with the left eye, and hence first showing the image 2022L, and then the image for the right eye 2022R. Later, the images 2023L, 2023R for the eyes, left and right respectively, of the third gamer 1803 are also shown.

As yet mentioned above, a signal is now being transmitted towards the glasses (instead of the cameras as we had before). The glasses may (a) either receive the signal Ms, being the overall sync signal, or (b) else they may receive signal Ms1, Ms2 or Ms3 being the sync signal for first, second and third gamer (and their corresponding glasses) respectively. Receiving such signals can be for example through radio, Wi-Fi or infrared. In case of (a), each of the glasses should have a kind of memory or local storage in order to know when the shutter opening time begins. The glasses can be pre-programmed to have at least one tdx and $\Delta tx$ (where x=1, 2, 3 . . . n, wherein n is an integer number). On receipt of the signal Ms (also called Master sync), the glasses remain black until tdx is reached and the glasses shutter is opened subsequently for time $\Delta tx$. As a result, the first gamer 1801 only sees image 1921 (or left eye image 2021L and right eye image 2021R consecutively). Glasses can have multiple memories to store for example data. For first, second or third glasses 1811, 1812, 1813, a button or signal can be used to switch between channels. In case of (b), each of the glasses should know how long the shutter has to be opened, and which channel should be chosen. Hence, here, a lot less memory or local storage is needed as compared to (a). The glasses can be pre-programmed to detect either Ms1, Ms2 or Ms3, and each having a shutter opening time $\Delta tx$. Upon detection of their Msx signal to which they are programmed, the glasses shutter will open for time $\Delta tx$, and the gamer only sees his intended image 1921, 1922, 1923.

It is noted that, in order to avoid flicker, multiple shutter opening times per frame are defined, herewith smoothening out disturbances to the eye.

Although the embodiment described above, is referring to three gamers, this could also be applied to less or more (e.g. n gamers, wherein n is an integer number) gamers. The embodiment as described above could also be applied to audience and show performance, or even TV sets at home, wherein each user is able to see from a different point of view, or even a different movie (at home).

The audio can be for example selected using knowledge of different channels, using for example headsets but can also be enabled using directed sound.

In terms of advantages, it is listed that with the invention, hence multiple cameras can take same life shot with different background, i.e. for example special effects, subtitles when these so called glasses are used;

two or more movies could be seen for the price of one;

one screen is provided, and multiple users can be watching, each possibly having different content;

space can be saved, for example in a cinema, a room with capacity of 1000 people could show different movies simultaneously;

interactivity (gaming) for users but also spectators wanting to see from different points of view.

The invention claimed is:

1. A display system comprising:

a light source display configured to display content comprising a plurality of images;

a processing system comprising one or more processors or processing devices, the processing system being configured to control content displayed by the light source display by a light source display input signal;

wherein the processing system is configured to cause the light source display to display a first image during a first shutter opening time of a first camera wherein a shutter of the first camera is open, and display a second image during a second shutter opening time of a second camera wherein the shutter of the second camera is open, the second shutter opening time of the second camera being different than the first shuttering time of the first camera, wherein the first image is displayed by the light source display while the shutter of the second camera is closed and the second image is displayed by the light source display while the shutter of the first camera is closed.

2. The display system according to claim 1, wherein the processing system or at least a portion of the processing system is integrated within the light source display.

3. The display system according to claim 1, further comprising a memory storage configured to store therein content displayed by the light source display.

4. The display system according to claim 3, wherein the memory storage is integrated within the light source display.

5. The display system according to claim 1, wherein the content to be displayed by the light source display, is fed from an external video source, or from an internal non-volatile data storage.

6. The display system according to claim 1, the content to be displayed by the light source display includes video and/or images, text and/or graphics, and/or markers.

7. The display system according to claim 1, the content to be displayed by the light source display is viewable for the human eye.

8. The display system according to claim 1, wherein the content to be displayed by the light source display includes images only visible by a camera that obtains infrared images.

9. The display system according to claim 1, wherein the processing system is configured to improve an interplay of the light source display with the first and/or second camera recording the images displayed by the light source display, by: (i) receiving a content display signal; (ii) receiving one or more values representing a programmable off-set relative to the operation of said first and/or second camera; and (iii) outputting the light source display input signal to the light source display based on said one or more programmable off-set values.

10. The display system according to claim 9, wherein the one or more programmable off-set values are automatically optimally determined in relation to the start and length of the first and/or second camera shutter opening time and/or the start and length of the first and/or second camera shutter opening time are automatically determined, by applying the following steps: (a) displaying an image; (b) changing the one or more programmable off-set values and/or the start and length of the shutter opening time; (c) analyzing the recording of the image on said first and/or second camera in accordance with step (iii) above for each of the one or more programmable off-set values and/or the start and length during said changing thereof in (b); and (d) using a result of the analyzing to determine suitable programmable off-set values and/or start and length of the first and/or second camera shutter opening time.

11. The display system according to claim 10, herein prior to step (iii) an intermediate step is provided for receiving a signal related to the operation of said first and/or second camera.

12. The display system according to claim 9, wherein prior to step (iii) an intermediate step is provided for receiving a signal related to the operation of said first and/or second camera.

13. The display system according to claim 9, wherein said one or more programmable off-set values is selected to improve said interplay of said light source display with said camera in order to improve energy efficiency and/or to reduce banding effects.

14. An arrangement comprising:

the display system according to claim 1;

the first camera; and the second camera.

15. A processing system comprising one or more processors or processing devices, the processing system being configured to control content displayed by a light source display by a light source display input signal;

wherein the processing system is configured to cause the light source display to display a first image during a first shutter opening time of a first camera wherein a shutter of the first camera is open, and display a second image during a second shutter opening time of a second camera wherein the shutter of the second camera is open, the second shutter opening time of the second camera being different than the first shuttering time of the first camera, wherein the first image is displayed by the light source display while the shutter of the second camera is closed and the second image is displayed by the light source display while the shutter of the first camera is closed.

16. The processing system according to claim 15, wherein the processing system is configured to improve an interplay of the light source display with the first and/or second camera recording the images displayed by the light source display, by: (i) receiving a content display signal; (ii) receiving one or more values representing a programmable off-set relative to the operation of said first and/or second camera; and (iii) outputting the light source display input signal to the light source display based on said one or more programmable off-set values.

17. The processing system according to claim 16, wherein prior to step (iii) an intermediate step is provided for receiving a signal related to the operation of said first and/or second camera.

18. The processing system according to claim 16, wherein said one or more programmable off-set values is selected to improve said interplay of said light source display with said camera in order to improve energy efficiency and/or to reduce banding effects.

19. The processing system according to claim 15, wherein the one or more programmable off-set values are automatically optimally determined in relation to the start and length of the first and/or second camera shutter opening time and/or the start and length of the first and/or second camera shutter opening time are automatically determined, by applying the following steps: (a) displaying an image; (b) changing the one or more programmable off-set values and/or the start and length of the shutter opening time; (c) analyzing the recording of the image on said first and/or second camera in accordance with step (iii) above for each of the one or more programmable off-set values and/or the start and length during said changing thereof in (b); and (d) using a result of the analyzing to determine suitable programmable off-set values and/or start and length of the first and/or second camera shutter opening time.

20. The processing system according to claim 19, herein prior to step (iii) an intermediate step is provided for receiving a signal related to the operation of said first and/or second camera.

21. A method for controlling content displayed by a light source display by a light source display input signal, the method comprising:

causing the light source display to display a first image during a first shutter opening time of a first camera wherein a shutter of the first camera is open, and display a second image during a second shutter opening time of a second camera wherein the shutter of the second camera is open, the second shutter opening time of the second camera being different than the first shuttering time of the first camera, wherein the first image is displayed by the light source display while the shutter of the second camera is closed and the second image is displayed by the light source display while the shutter of the first camera is closed.

22. A non-transitory recording medium having instructions stored thereon, which, when executed by one or more processors, configure the one or more processors to perform the method according to claim 21.

* * * * *